(12) United States Patent
Liang et al.

(10) Patent No.: US 11,183,930 B2
(45) Date of Patent: Nov. 23, 2021

(54) POWER-SAVE MODE PULSE GATING CONTROL FOR SWITCHING CONVERTER

(71) Applicant: Texas Instruments Incorporated, Dallas, TX (US)

(72) Inventors: Jian Liang, Shanghai (CN); Wei Zhao, Shanghai (CN); Weiwei Xiong, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/426,942

(22) Filed: May 30, 2019

(65) Prior Publication Data

US 2020/0119641 A1 Apr. 16, 2020

Related U.S. Application Data

(60) Provisional application No. 62/745,539, filed on Oct. 15, 2018.

(51) Int. Cl.
*H05B 3/04* (2006.01)
*H05B 39/00* (2006.01)
*H02M 3/157* (2006.01)
*H02M 1/08* (2006.01)
*H04B 10/80* (2013.01)
*H02M 1/00* (2006.01)

(52) U.S. Cl.
CPC ............. *H02M 3/157* (2013.01); *H02M 1/08* (2013.01); *H02M 1/0009* (2021.05); *H02M 1/0032* (2021.05); *H04B 10/80* (2013.01)

(58) Field of Classification Search
CPC .... H05B 41/34; H05B 33/0803; H05B 39/09; H05B 41/28; H05B 33/0809; H05B 41/295; H05B 41/2827; H05B 41/3925; H05B 33/0815; H05B 33/0818; H05B 41/2828; H05B 41/3921; H05B 41/3927; Y02B 20/202; Y02B 70/10; H02M 3/157; H02M 1/08; H02M 2001/0009; H02M 2001/0032; H02M 3/156; H02M 2001/0025; H02M 1/15; H02M 2001/0048; H04B 10/80
See application file for complete search history.

(56) References Cited

U.S. PATENT DOCUMENTS

| | | | |
|---|---|---|---|
| 10,412,796 B2* | 9/2019 | Yang | H05B 33/0815 |
| 2009/0237053 A1* | 9/2009 | Gan | H02M 3/156 323/283 |
| 2016/0088697 A1* | 3/2016 | Yan | H05B 33/0818 315/205 |
| 2017/0012525 A1* | 1/2017 | Corleto | H02M 3/158 |
| 2017/0207723 A1* | 7/2017 | Zhang | H02M 3/1584 |
| 2018/0019671 A1* | 1/2018 | Li | H02M 1/083 |

* cited by examiner

*Primary Examiner* — Minh D A
(74) *Attorney, Agent, or Firm* — Michael A. Davis, Jr.; Charles A. Brill; Frank D. Cimino

(57) ABSTRACT

An optical communication system includes a light source and an output capacitor coupled to the light source. The system also includes a switching converter circuit coupled to the output capacitor. The switching converter circuit is configured to provide an output voltage to the output capacitor based on an active mode and a power-save mode. The switching converter circuit includes a controller configured to perform pulse gating in the power-save mode based on a timer and a comparison of the output voltage with a voltage threshold.

19 Claims, 11 Drawing Sheets

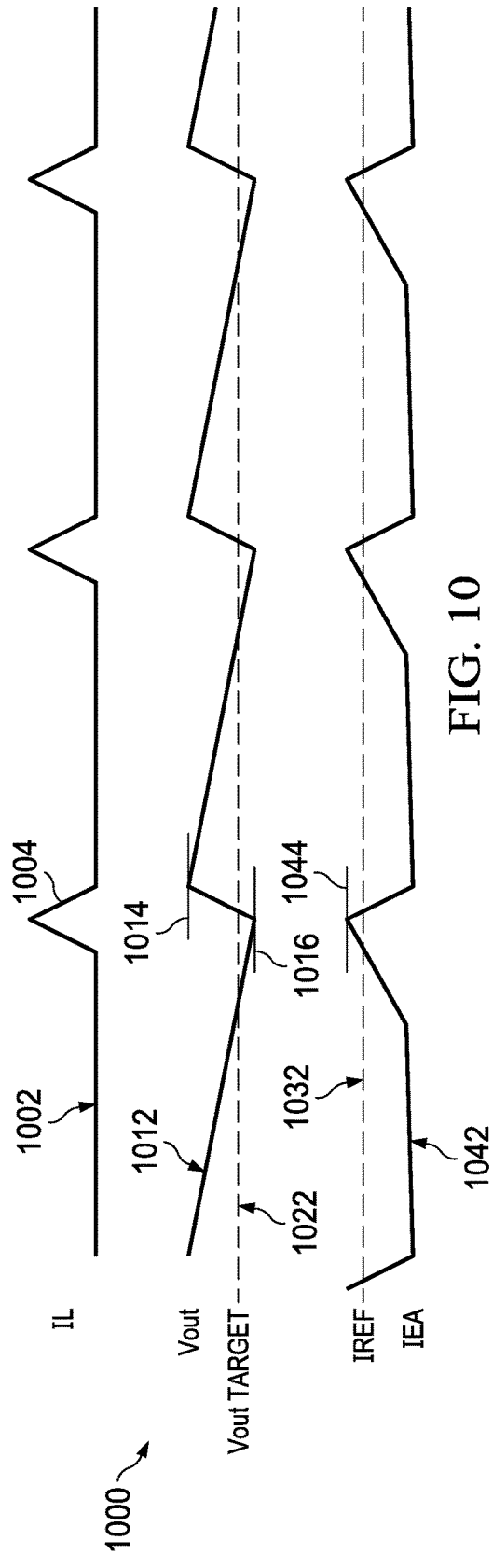
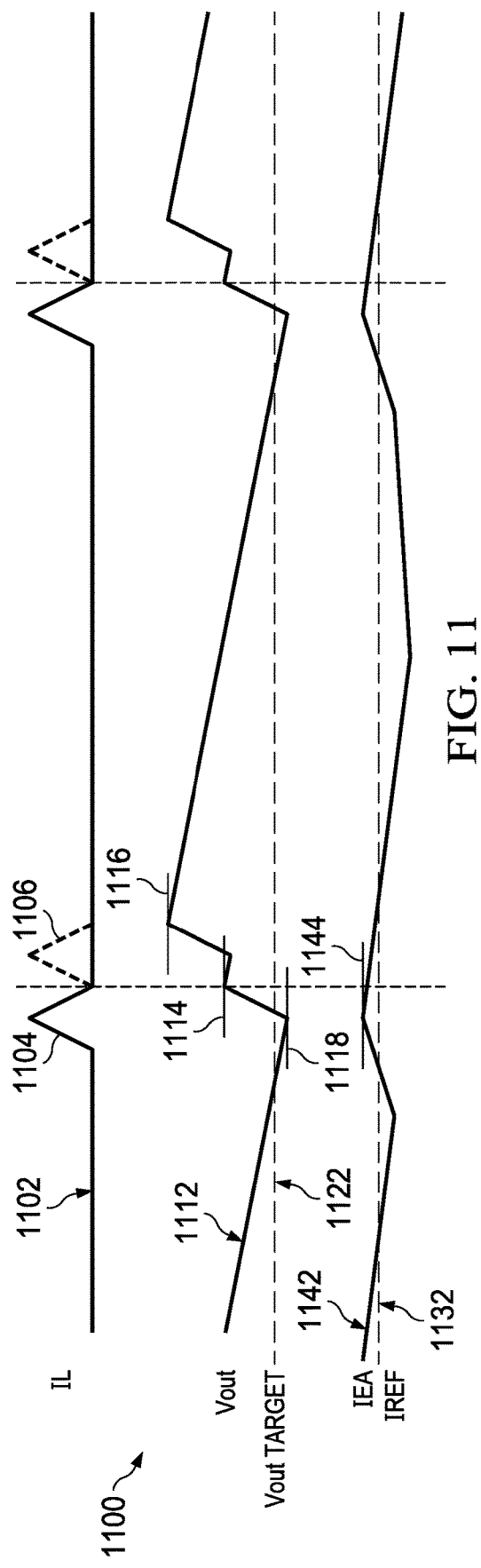

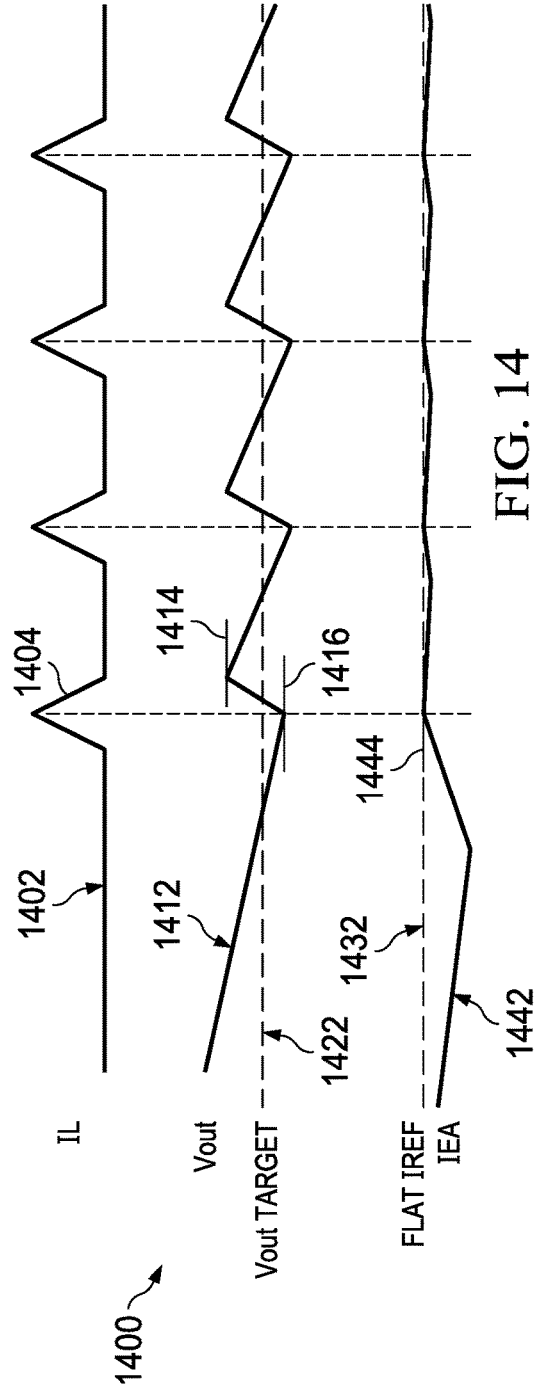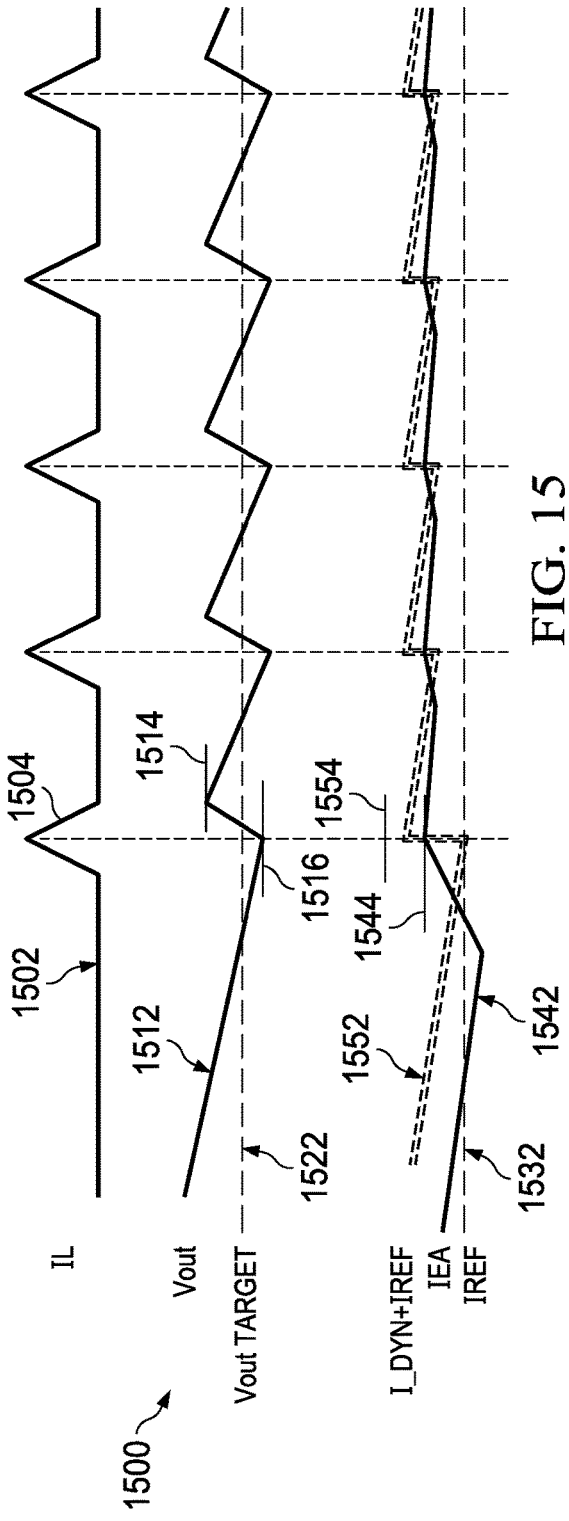

POWER-SAVE MODE PULSE GATING CONTROL FOR SWITCHING CONVERTER

CROSS-REFERENCE TO RELATED APPLICATIONS

This application claims priority to U.S. Provisional Application No. 62/745,539, filed Oct. 15, 2018, which is hereby incorporated by reference.

BACKGROUND

Power supplies and power converters are used in a variety of electronic systems. Electrical power is generally transmitted over long distances as an alternating current (AC) signal. The AC signal is divided and metered as desired for each business or home location, and is often converted to direct current (DC) for use with individual electronic devices or components. Modern electronic systems often employ devices or components designed to operate using different DC voltages. Accordingly, different DC-DC converters, or a DC-DC converter that supports a wide range of output voltages, are needed for such systems.

There are many different DC-DC converter topologies. The available topologies differ with regard to the components used, the amount of power handled, the input voltage(s), the output voltage(s), efficiency, reliability, size and/or other characteristics. Some switching converter topologies (referred to as buck converters) provide an output voltage that is reduced relative to an input supply voltage, while other switching converter topologies (referred to as boost converters) provide an output voltage that is higher than an input supply voltage. Efforts to improve efficiency and output voltage accuracy of switching converters are going.

SUMMARY

In accordance with at least one example of the disclosure, an optical communication system comprises a light source and an output capacitor coupled to the light source. The system also comprises a switching converter circuit coupled to the output capacitor. The switching converter circuit is configured to provide an output voltage to the output capacitor based on an active mode and a power-save mode. The switching converter circuit comprises a controller configured to perform pulse gating in the power-save mode based on a timer and a comparison of the output voltage with a voltage threshold.

In accordance with at least one example of the disclosure, a switching converter circuit comprises an output node and a converter switch coupled between the output node and a ground node. The switching converter circuit also comprises a comparator with a first input node, a second input node, and an output node. The first input node of the comparator is coupled to an error amplifier output current source, and the second input node of the comparator is coupled to a threshold current source. The switching converter circuit also comprises an AND gate with a first input node, a second input node, and an output node. The first input node of the AND gate is coupled to the output node of the comparator, the second input node of the AND gate is coupled to a timer, and the output node of the AND gate is coupled to a gate driver for the converter switch.

In accordance with at least one example of the disclosure, a switching converter device comprises an output node and a converter switch coupled between the output node and a ground node. The device also comprises a controller for the converter switch, wherein the controller is configured to perform pulse gating in a power-save mode based on a timer and a comparison of the output voltage with a voltage threshold.

In accordance with at least one example of the disclosure, a switching converter controller circuit comprises a current comparator and a first current source coupled to a first input node of the current comparator and configured to provide an error amplifier current to the first input node of the current comparator. The switching converter controller circuit also comprises a second current source coupled to the first input node of the current comparator and configured to apply a hysteresis current to the first input node of the current comparator via a switch. The switching converter controller circuit a sensor coupled to a second input node of the current comparator and configured to provide a sensed output current for the switching converter to the second input node of the current comparator. The switching converter controller circuit also comprises an AND gate with a first input node coupled to a timer circuit, wherein the AND gate is configured to control when the output of the current comparator is provided to a driver circuit.

BRIEF DESCRIPTION OF THE DRAWINGS

For a detailed description of various examples, reference will now be made to the accompanying drawings in which:

FIGS. 10-15 are timing diagrams showing waveforms related to switching converters in accordance with some examples;

DETAILED DESCRIPTION

Figure 1:
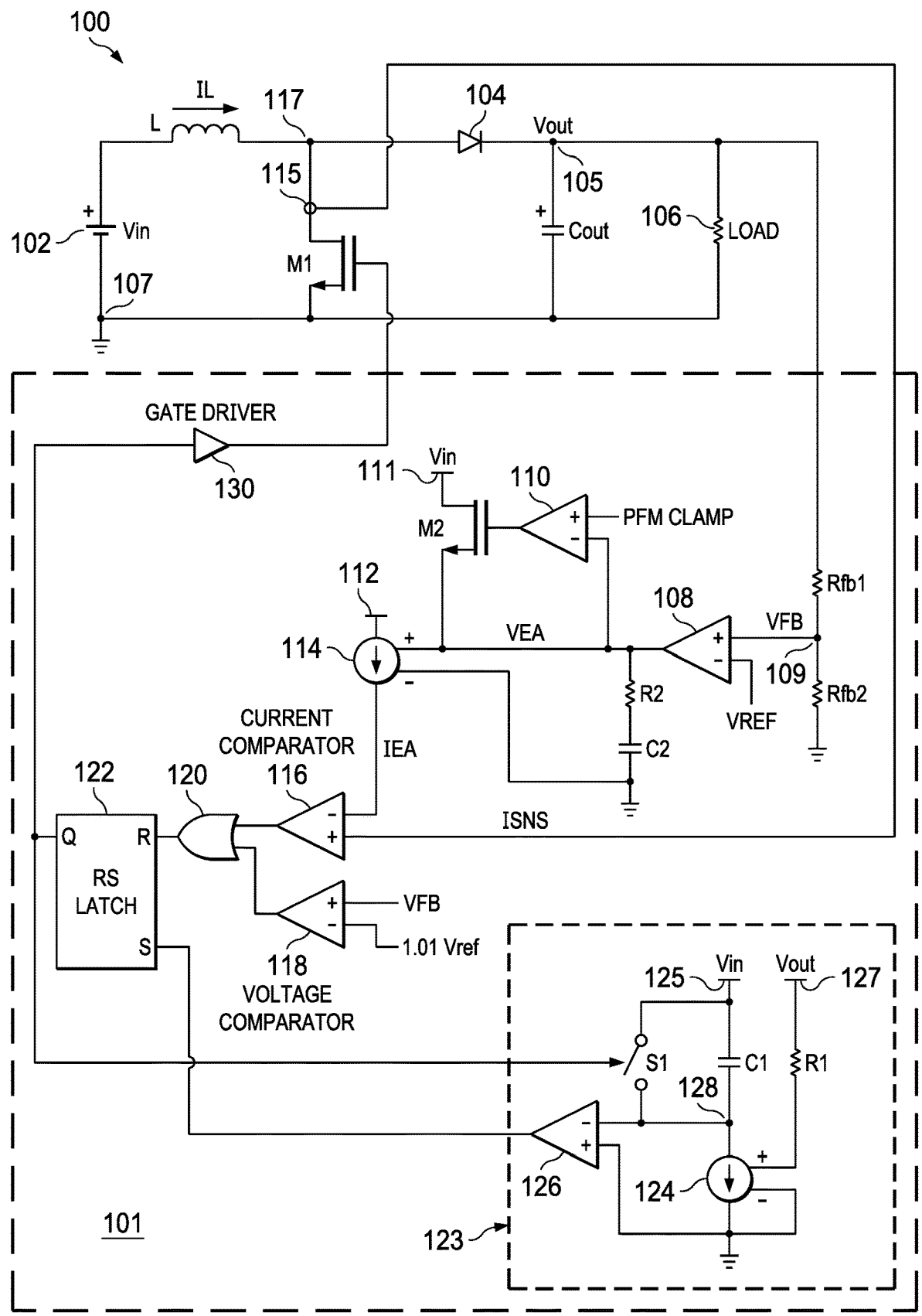
FIG. 1 is a schematic diagram showing a system in accordance with some examples.

Disclosed herein are switching converter topologies with a controller that supports an active mode and a power-save mode. In some examples, the power-save mode involves a pulse gating control technique based on a timer and a comparison of an output voltage of the switching converter with a voltage threshold. With the disclosed pulse gating control technique, the output voltage accuracy and switching converter efficiency is improved compared to other power-save modes.

In some examples, the comparison of the output voltage with a voltage threshold involves transforming the output voltage into an error amplifier output current. This error amplifier output current is combined with a hysteresis current. In one example, the combined current (the error amplifier output current and the hysteresis current) is compared with a sense current (e.g., provided by an inductive current sensor at an output node of the switching converter) by a first comparator. In this example, the output of the first comparator is provided to a latch input node. Meanwhile, the latch control node is coupled to the output node of an AND gate. A first input node of the AND gate is coupled to a timer control signal. A second input node of the AND gate is coupled to the output node of a second comparator. The second comparator compares the error amplifier output current with a reference current. In one example, the reference current is combined with a ramp current. When the output of the second comparator is high and the output of the timer is high, then the output of the AND gate is high. When the output of the AND gate is high, the latch passes the output of the first comparator to control a gate driver for a switch coupled between an output node of the switching converter and a ground node.

In another example, the comparison of the output voltage with a voltage threshold involves transforming the output voltage into an error amplifier output current. This error amplifier output current is combined with a hysteresis current. In this other example, the combined current (the error amplifier output current and the hysteresis current) is compared with a reference current by a comparator. For example, the reference current includes a sense current (e.g., provided by an inductive current sensor at an output node of the switching converter), a reference current, and a current ramp. Also, the output of the comparator is provided to a first input node of an AND gate. The second input node of the AND gate is coupled to a timer. When the output of the comparator is high and the output of the timer is high, then the output of the AND gate is high. When the output of the AND gate is high, the latch passes the output of the comparator to control a gate driver for a switch coupled between an output node of the switching converter and a ground node.

In some examples, the disclosed switching converter topology is used in an optical communication system. In such a system, an example input supply voltage (VIN) to a switching converter (e.g., a boost converter) is 3.3V, and an example output supply voltage (VOUT) from the switching converter is 20V to 80V. In an optical communication scenario, VOUT from the switching converter is to drive a light source (e.g., an avalanche photodiode (APD)), where the light source is used for optical communications. The light source current is the loading of the switching converter (e.g., an APD current is typical 2 µA to 2 mA). In some examples, the switching converter topology is also configured to measure the light source current by obtaining samples of the light source current, converting the samples to respective voltage signals, and buffering the voltage signals. As desired, an external system may use an analog-to-digital converter (ADC) to read the output voltage. Some light sources such as APDs need a high voltage, and it is important that this voltage is low ripple and low noise (so the sampled APD current is accurate enough).

In an example switching converter device, the light source current (2 µA to 2 mA) is mirrored, and one or more ratio options are used to provide a current proportional to light source current. By connecting a resistor from the mirror output to a ground node, the current flowing through the light source is converted into the voltage across the resistor. The device also includes sample/hold circuitry built-in and triggered by an external sampling clock. In some examples, the current mirror signal (the voltage across the resistor) is transferred and stored on a hold-up capacitor. The voltage on the hold-up capacitor is then passed over to the output of an operational amplifier. An external ADC can sense the voltage of the output of the operational amplifier to measure the current signal of the light source. To provide a better understanding, various switching converter options and related power-save mode options are described using the figures as follows.

FIG. 1 is a schematic diagram showing a system 100 in accordance with some examples. The system 100 of FIG. 1 includes a switching converter (e.g., with an inductor (L), a switch (M1), a diode 104, an output capacitor (Cout), and a control circuit 101 for M1) coupled to a load 106. As shown, the system 100 includes a supply voltage (Vin) source 102 coupled to a first end of L. The second end of L is coupled to an output node 105 via a diode 104. More specifically, the anode of the diode 104 is coupled to the second end of L, and the cathode of the diode 104 is coupled to the output node 105 of the boost converter. As shown, an output capacitor (Cout) is used at the output node 105. More specifically, the top plate of Cout is coupled to the output node 105, and the bottom plate of Cout is coupled to a ground node 107. Also, a resistive load 106 is also coupled between the output node 105 and the ground node 107. Also, the output node 105 is coupled to a control circuit 101, where the control circuit 101 generates a drive signal for a M1. As shown, the control terminal for M1 is coupled to the control circuit 101, the first current terminal of M1 is coupled to the second end of L, and the second current terminal of M1 is coupled to the ground node 107. In operation, the control circuit 101 determines when M1 is turned on and off to control Vout (e.g., to maintain Vout above a threshold even if the value of the load 106 is variable) at the output node 105.

In the example of FIG. 1, the control circuit 101 includes a voltage divider coupled to the output node 105, where the voltage divider includes two resistors, Rfb1 and Rfb2. The voltage at the node 109 between Rfb1 and Rfb2 is a feedback voltage (VFB). As shown, VFB is provided to an operational amplifier 108 along with a reference voltage (VREF). The output from the operational amplifier 108 is an error amplifier voltage (VEA) that used to generate an error amplifier current. More specifically, a current source 114 generates the error amplifier current based on an input voltage from the node 112, based on VEA, and based on the values of R2 and C2. As shown, R2 and C2 are coupled in series between the output of the operational amplifier 108 and a ground node. Also, the ground node is coupled to a negative terminal of the current source 114. Also, VEA is adjustable using a comparator 110 to drive a transistor (M2) based on a comparison of VEA with a pulse frequency modulation (PFM) clamp signal (an internal reference signal power by Vin). As shown, the first current terminal of M2 is coupled to an input supply voltage (Vin) node 111, and the second current terminal of M2 is coupled to the current source 114. The operational amplifier 108, R2, C2, and the current source 114 operate as a transconductance stage, where R2 and C2 correspond to an integration stage or compensation network for the transconductance stage.

The output of the current source 114 is an error amplifier current (IEA) or adjusted error amplifier current (IC) that is provided to a current comparator 116. The current comparator 116 also receives a current sense signal (ISNS) from a loop sensor 115 inductively coupled to node 117 (between the second end of L and the anode of the diode 104). The output of the current comparator 116 is coupled to an input node of an OR gate 120. Another input node of the OR gate 120 receives the output of a voltage comparator (a power-save mode comparator) 118 configured to compare VFB with a scaled version of VREF (e.g., 1.01*VREF to identify when Vout is 1% above a target). The output of the OR gate 120 is provided to the R node of an RS latch 122. The S node of the RS latch 122 receives a control signal from a timer 123. In some examples, the timer 123 includes a current source 124 and a comparator 126. More specifically, the comparator 126 is configured to compare a ground voltage with a voltage value at the node 128, where the voltage value at the node 128 is a function of Vin, C1, Vout, R1, and a switch (S1).

When the output of the RS latch 122 is high, S1 is on, and the voltage at the node 128 is pulled up to Vin, resulting in the output of the timer 123 being low. When the output of the RS latch 122 is low, S1 is open and the voltage at node 128 is discharged, where the discharge current is Vout/R1. Also, the capacitance at node 128 is C1, so the amount of time to discharge node 128 to ground is given as (Vin/Vout) *R1*C1. Once the node 128 is discharged to ground, the output of the comparator 126 is high, resulting in the value at the R node of the RS latch 122 being passed to the Q node. Thus, if the output of the OR gate 120 is high when the output of the comparator 126 is high, the RS latch 122 outputs a high value, which causes the gate driver 130 to turn M1 on. When the current of M1 is ramped up, the sensed current provided by the sensor 115 is also ramped up. Once ISNS is higher than the output (IEA) of the current source 114, the current comparator 116 outputs a high signal, resulting in the R node of the RS latch 122 being high, the output of the RS latch 122 being low, and M1 being turned off.

Figure 2:
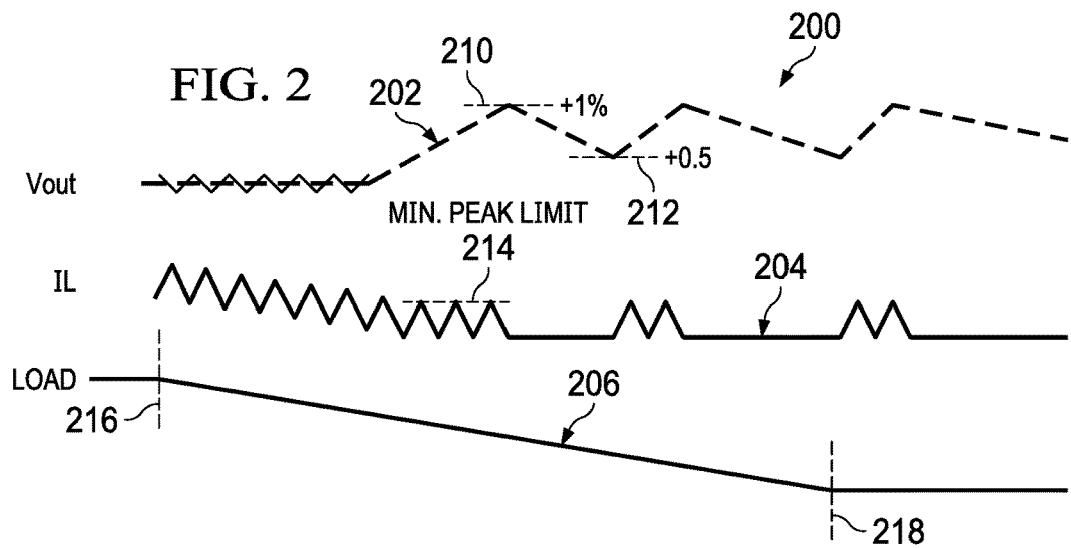
FIGS. 2-4 are timing diagrams showing waveforms related to the switching converter of FIG. 1 in accordance with some examples.
Figure 3:
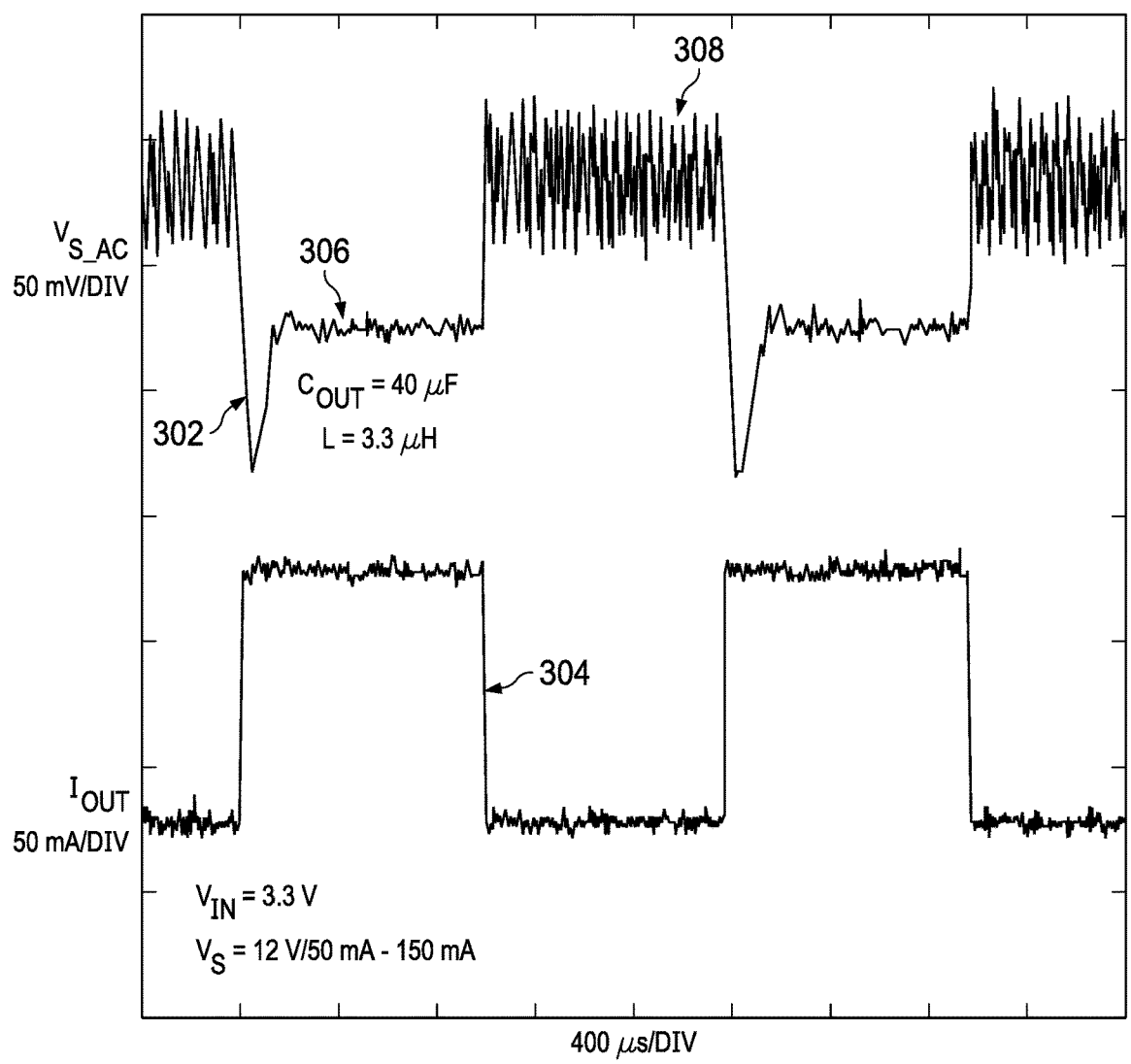
Figure 4:
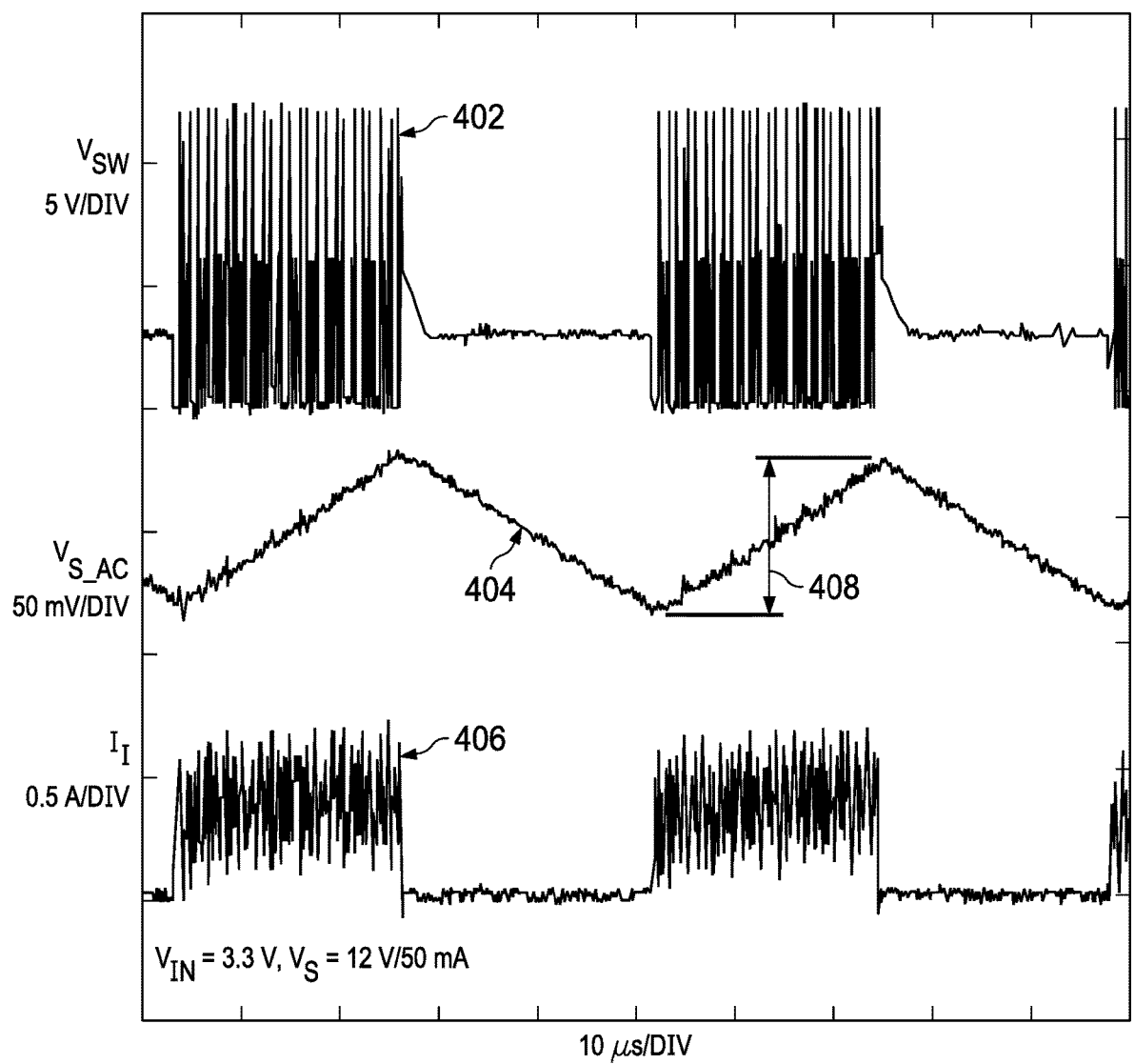

FIGS. 2-4 are timing diagrams 200, 300, and 400 showing waveforms related to the switching converter for the system 100 of FIG. 1 in accordance with some examples. More specifically, the timing diagrams 200, 300, and 400 show waveforms related to power-save mode operations of the switching converter for the system 100 of FIG. 1. In the timing diagram 200 of FIG. 2, various waveforms are represented, including a Vout waveform 202, an inductor current (IL) waveform 204, and a load waveform 206. As shown, when the load represented by the load waveform 206 begins to fall from a maximum value at time 216 to a minimum value at time 218, IL represented by the IL waveform 204 ramps up and down due to switching operations (e.g., M1 control) until a peak voltage 210 is reached by Vout as shown in the Vout waveform 210. Once the peak voltage 210 (e.g., 1% above a target Vout) is reached, IL goes to zero due to switching operations (e.g., M1 control), and Vout drops since there is still some load. Once Vout reaches another threshold 212 (e.g., 0.5% above a target Vout), IL ramps up and down again due to switching operations (e.g., M1 control), which causes Vout to reach the peak voltage 210 again. The process is repeated, where the amount of time IL stays at zero is a function of the load.

The timing diagram 200 represents one PFM solution for a switching converter (e.g., a boost converter), where minimum peak current limit 214 is set to a certain value by clamping the bottom value of the error amplifier output. When the load current is too low for the minimum peak current, Vout increases. For voltages above 1% of the target Vout value, the switching converter stops switching (e.g., M1 stays off). When Vout drops below 0.5% above the target Vout, the switching converter is turned on again (e.g., M1 is switched on and off).

In the timing diagram 300 of FIG. 3, various waveforms are represented, including an output voltage AC ripple ($V_{S\_AC}$) waveform 302 and an output current ($I_{OUT}$) waveform 304. As shown, transitions of the $V_{S\_AC}$ waveform 302 are aligned with transitions of the $I_{OUT}$ waveform 304. More specifically, when $V_{S\_AC}$ of the $V_{S\_AC}$ waveform 302 transitions from high-to-low, $I_{OUT}$ of the $I_{OUT}$ waveform 304 transitions from low-to-high. Also, when $V_{S\_AC}$ of the $V_{S\_AC}$ waveform 302 transitions from low-to-high, $I_{OUT}$ of the $I_{OUT}$ waveform 304 transitions from high-to-low. As shown, the $V_{S\_AC}$ waveform 302 includes an interval 306 corresponding to pulse width modulation (PWM) operations, and an interval 308 corresponding to PFM operations. In the timing diagram 300, various parameters are assumed including Cout=40 µF, L=3.3 µF, Vin=3.3V, and Vs=12V/50 mA (i.e., Vs=12V with an output current of 50 mA).

In the timing diagram 400 of FIG. 4, various waveforms are represented, including a switching node voltage (Vsw) waveform 402, a $V_{S\_AC}$ waveform 404, and an output current (IL) waveform 406. As shown, the value of the Vsw waveform 402 and the value of the IL waveform 406 are unstable during a rising slopes of the $V_{S\_AC}$ waveform 404. During falling slopes of the $V_{S\_AC}$ waveform 404, the value of the Vsw waveform 402 and the value of the IL waveform 406 are stable. In the timing diagram 400, various parameters are assumed including Vin=3.3V, and Vs=12V/50 mA.

As represented in the timing diagrams 200, 300, and 400, the performance of the switching converter for the system 100 of FIG. 1 during power-save mode operations has some undesirable features. More specifically, the output direct-current (DC) accuracy for PFM and PWM operations is unstable as indicated by intervals 306 and 308 (a difference of 0.5% is represented). Also, output alternating-current (AC) ripple during power-save mode operations is much higher than in active mode operations (e.g., the output AC ripple is at least 0.5%*Vout as represented in the Vout waveform 202. Efforts to reduce the output AC ripple using larger Cout values are not effective. If the target Vout is 5V, then a 1% ripple adds an error of 50 mV, and a 0.5% ripple add an error of 25 mV, which is acceptable for most applications. However, if the target Vout is 50V, then a 1% ripple adds an error of 500 mV, and a 0.5% ripple adds an error of 250 mV, which is not acceptable for many applications.

Figure 5:
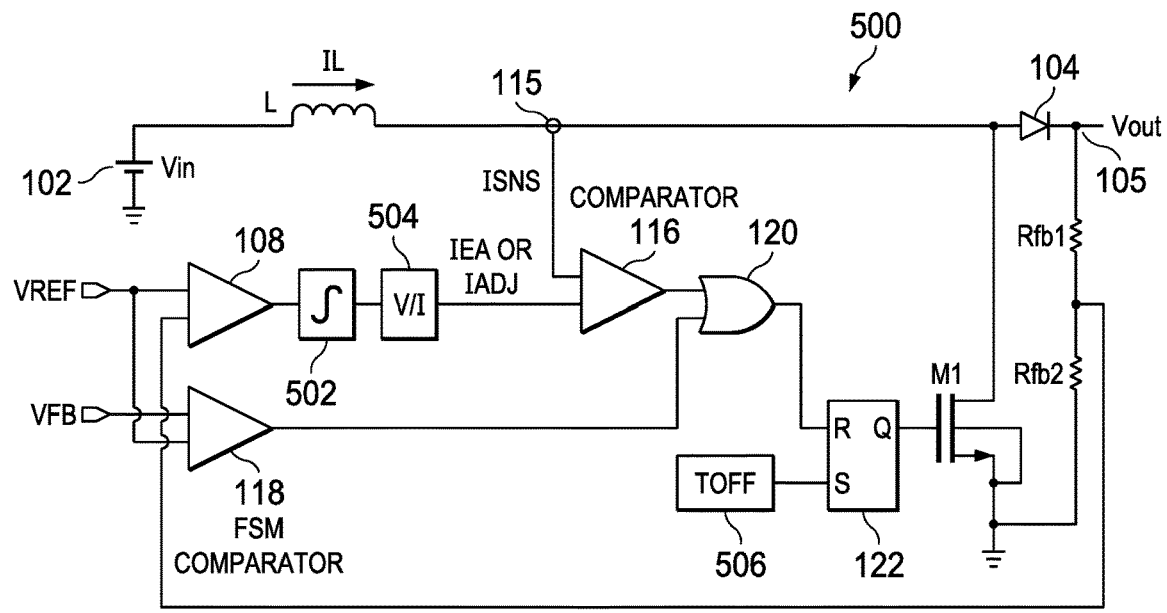
FIG. 5 is a schematic diagram showing a switching converter topology in accordance with some examples.

FIG. 5 is a schematic diagram showing a switching converter topology 500 in accordance with some examples. The switching converter topology 500 includes many of the components introduced for the switching converter in the system 100 of FIG. 1, including the supply voltage source 102, L, the diode 104, Rfb1, Rfb2, M1, sensor 115, the output node 105, the operational amplifier 108, the current comparator 116, the voltage comparator 118, the OR gate 120, and the RS latch 122. In the switching converter topology 500, a timer (TOFF) 506 is included in place of the timer 123 in FIG. 1 (e.g., the timer 123 is an example of the timer 506). Also, an integrator stage 502 (e.g., R2 and C2 in FIG. 1) and a V/I stage 504 (e.g., the current comparator 114 of FIG. 1) represented in FIG. 5, where the operational amplifier 108, the integrator stage 502, and the V/I stage 504 correspond to a transconductance stage to provide IEA or IADJ to the current comparator 116. The performance of the switching converter topology 500 during power-save mode operations has the same undesirable features as the switching converter for the system 100 in FIG. 1.

Figure 6:
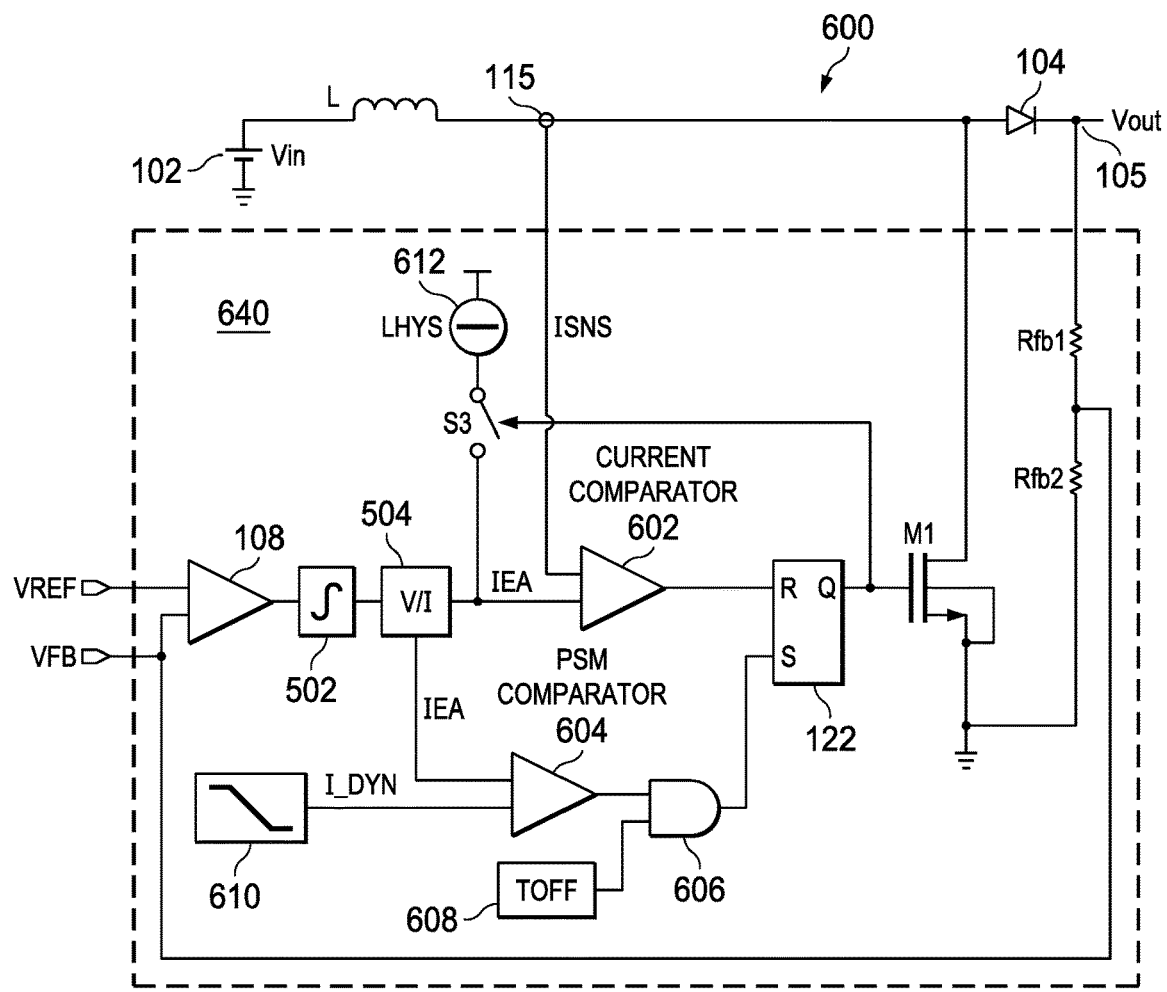
FIG. 6 is a schematic diagram showing another switching converter topology in accordance with some examples.

FIG. 6 is a schematic diagram showing another switching converter topology 600 in accordance with some examples. The switching converter topology 600 includes many of the components introduced for the switching converter for the system 100 of FIG. 1, including the supply voltage source 102, L, the diode 104, Rfb1, Rfb2, M1, sensor 115, the output node 105, the operational amplifier 108, and the RS latch 122. The switching converter topology 600 also includes the integrator stage 502 (e.g., R2 and C2 in FIG. 1) and the V/I stage 504 (e.g., the current comparator 114 of FIG. 1) introduced for the switching converter topology 500 of FIG. 5, where the operational amplifier 108, the integrator stage 502, and the V/I stage 504 correspond to a transconductance stage to provide IEA to a current comparator 602.

Relative to the switching converter for the system 100 of FIG. 1 and the switching converter topology 500 of FIG. 5, the switching converter topology 600 of FIG. 6 improves the performance of power-save mode operations (e.g., reducing output DC offset between PFM and PWM operations, and reducing output AC ripple). In the example of FIG. 6, the V/I stage 504 provides IEA to the current comparator 602, where IEA is selectively adjusted based on a hysteresis current (I_HYS). More specifically, I_HYS is provided by a current source 612 coupled to the output of the V/I stage 504 via a switch (S3), where S3 is controlled by the output of the RS latch 122. In operation, I_HYS is a DC current source that is used to set the peak inductor current for PFM operations. For example, I_HYS may be used to set the PFM peak current so that the EA dynamic transient range of the transconductance stage is reduced when entering and exiting PFM operations (for faster mode transitions). As shown, the R node input to the RS latch 122 is the output of the current comparator 602, which compares IEA or an adjusted IEA (IEA+I_HYS) with a sensed current (ISNS) provided by sensor 115.

In some examples, the switching converter topology 600 compares to the switching converter topology 500 as shown in Table 1.

TABLE 1

|  | Switching Converter topology 500 | Switching Converter topology 600 |
| --- | --- | --- |
| PWM Logic A) and B) repeated as loop | A) OFF time expired, stop OFF-phase, start ON-phase. B) IEA < ISNS, stop ON-phase, start OFF-phase. | A) OFF time expired, AND IEA > IREF, stop OFF-phase, start ON-phase. B) IEA + I_HYS < ISNS stop ON-phase, start OFF-phase |
| ON time (inductor peak current) in PFM | The output of EA has low clamp, ON time in PFM is decided by the low clamped value. | EA is not clamped, IEA is used to detect VOUT and decided when to start the next ON-Phase. ON time in PFM is decided by the hysteresis current. |
| ON time in PWM | In steady state ON time decided by the OFF time and the duty cycle; IEA regulates the inductor current. | In steady state ON time decided by the OFF time and the duty cycle; IEA + I_HYS regulate the inductor current |

As shown, the V/I stage 504 also provides IEA to another current comparator (e.g., a power-save mode comparator) 604. The other input to the current comparator 604 is a ramp current (I_DYN) provided by a ramp current source 610. The output of the current comparator 604 is provided to an AND gate 606. The other input of the AND gate 606 is a timer signal provided by a timer 608. The output of the AND gate 606 is input to the S node input of the RS latch 122 to control when the value at the R node input is passed to the output node (Q node) of the RS latch 122.

Figure 7:
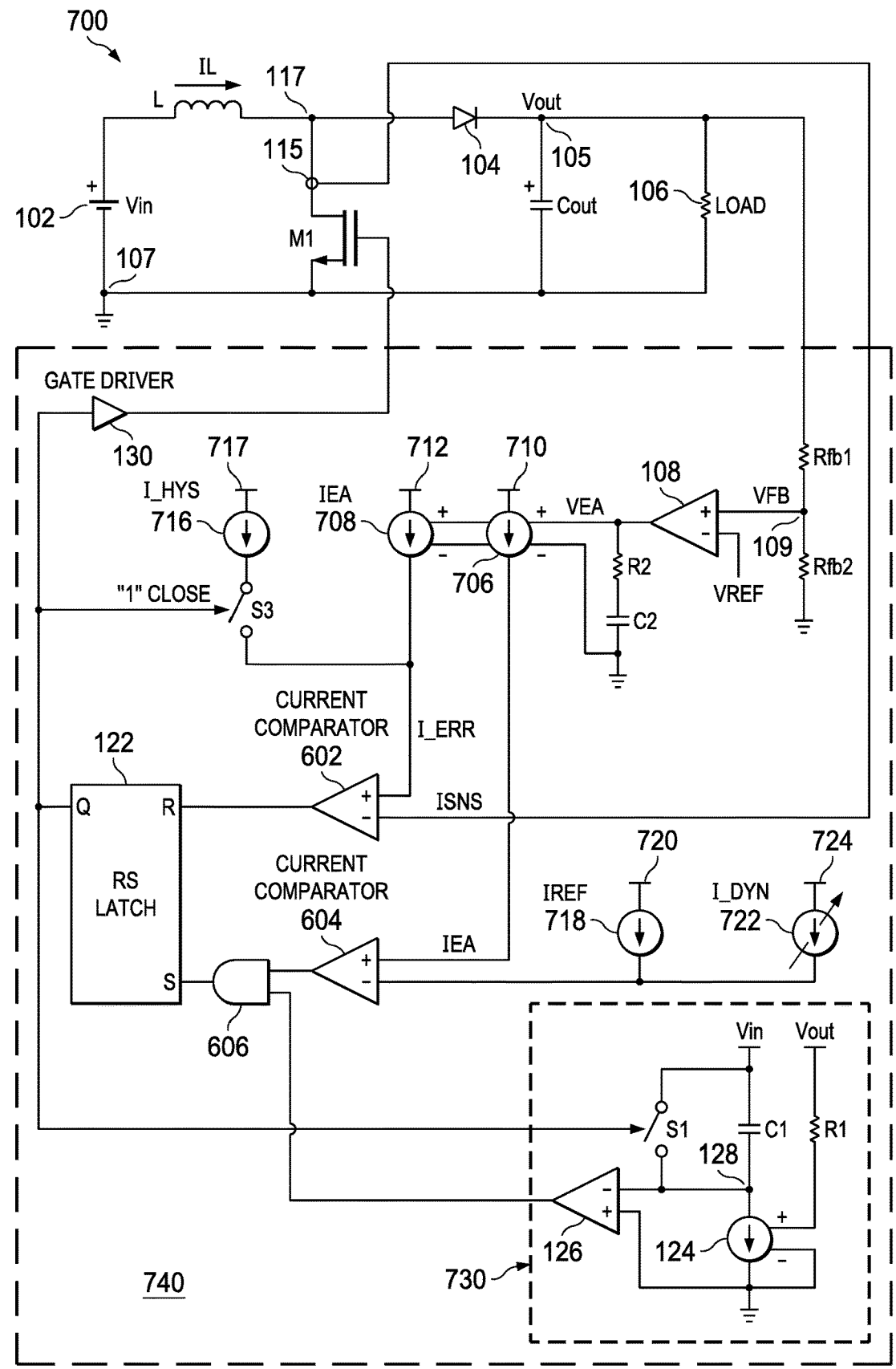
FIGS. 7 and 8 are schematic diagrams showing other systems in accordance with some examples.
Figure 8:
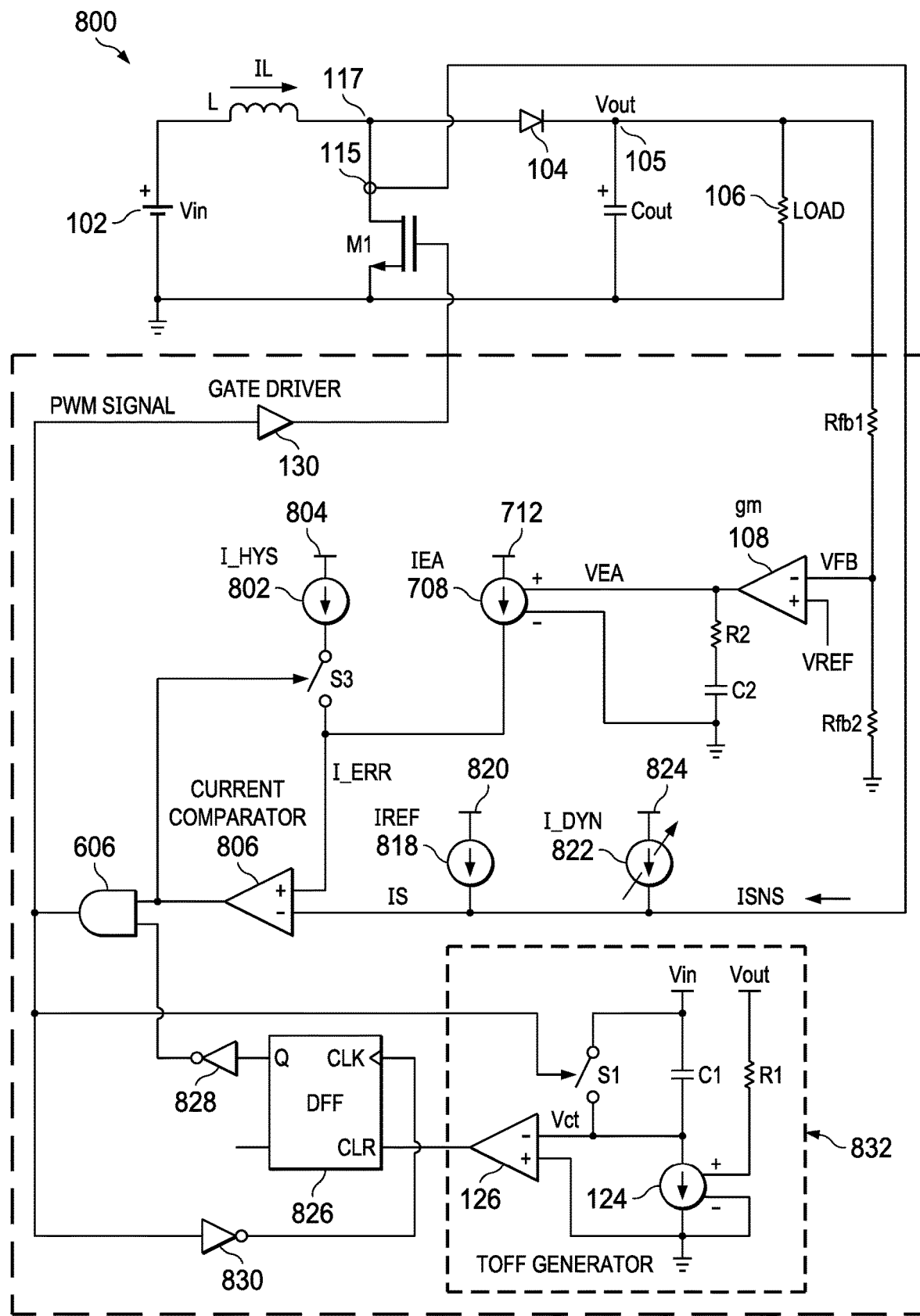

FIGS. 7 and 8 are schematic diagrams showing systems 700 and 800 that employ the switching converter topology of FIG. 6. As shown in FIG. 7, system 700 includes a switching converter (e.g., with L, M1, the diode 104, Cout, and a control circuit 740 for M1) coupled to the load 106. More specifically, the system 700 includes many of the components introduced for the system 100 of FIG. 1, including the supply voltage source 102, L, the diode 104, Rfb1, Rfb2, M1, sensor 115, the output node 105, the load 106, the operational amplifier 108, and the RS latch 122. Also, the timer 730 for the switching converter of the system 700 includes R1, C1, S1, the current source 124, and the comparator 126 introduced in FIG. 1.

In the example of FIG. 7, the control circuit 740 includes two current sources 706 and 708 coupled to output of the operational amplifier 108. The current source 706 provides IEA based on a supply voltage from node 710, R2, C2, and the output of the operational amplifier 108. In the example of FIG. 7, the operational amplifier 108, R2, C2, and the two current sources 706 and 708 correspond to a transconductance stage to provide two IEA outputs. The IEA value output from the current source 706 is provided to the current comparator 604, which compares this IEA value with a reference current corresponding to IREF from a first current source 718 plus a ramp current (I_DYN) from a second current source 722. In some examples, I_DYN is provided by a ramp current source (see e.g., FIG. 17), where I_DYN is used to generate the blanking time, which allows the switching converter control loop to have enough response time to achieve single pulse PFM.

As shown, the first current source 718 is coupled between a supply voltage node 720 and the negative input of the current comparator 602. The second current source 722 is coupled between a supply voltage node 724 and the negative input of the current comparator 602. The output of the current comparator 604 is provided to one of the input nodes of the AND gate 606. The other input node of the AND gate 606 is coupled to the timer 730. Thus, when IEA is higher than IREF+I_DYN, and when the timer signal from the timer 730 is high, the AND gate 606 provides a high signal to the S node of the RS latch 122, resulting in the R node value being passed to the Q node.

In the example of FIG. 7, the R node value for the RS latch 122 is provided by the current comparator 602. As shown, one of the inputs to the current comparator 602 is an IEA value provided by the current source 708, where the current source 708 provides IEA based on a supply voltage from node 712, R2, C2, and the output of the operational amplifier 108. Also, I_HYS is selectively added to the IEA value provided to the current comparator 602. Again, I_HYS is used to easily set the PFM peak current so that the EA dynamic transient range of the transconductance stage is reduced when entering and exiting PFM operations. In this manner, the speed of mode transitions (entering and exiting PFM operations) is reduced, which helps reduce output AC ripple.

More specifically, I_HYS is generated by a current source 716 and is provided to the current comparator 602 via a switch S3, where S3 is operated based on the output of the timer 730 or the RS latch 122. As shown, the current source 716 is coupled between S3 and a supply voltage node 717. Relative to the switching converter for the system 100 of FIG. 1 and the switching converter topology 500 of FIG. 5, the switching converter of the system 700 of FIG. 7 improves the performance of power-save mode operations (e.g., reducing output DC offset between PFM and PWM operations, and reducing output AC ripple).

Comparing the switching converter of the system 700 of FIG. 7 with the switching converter topology 500 of FIG. 5, several features may be highlighted. For example, in the switching converter topology 500, PWM operations are initiated using a timer (e.g., an off timer). Once the timer expires, PWM operations are initiated (stop off-phase, start on-phase). When IEA<ISNS, PWM operations are stopped (stop on-phase, start off-phase). In the switching converter topology 500, PFM operations are a function of the error amplifier clamp (the PFM "on" time is determined by the low clamped value). Also, the "on" time for PWM operations is decided by the "off" time and the duty cycle, where IEA regulates the inductor current. In the switching converter topology 500, PFM operations are a function of the error amplifier clamp (the PFM "on" time is determined by the low clamped value). In steady-state PWM operations, the "on" time is decided by the "off" time and the duty cycle, where IEA regulates the inductor current.

The switching converter of the system 700 also initiates PWM operations using a timer (e.g., an off timer). However, PWM operations are initiated (stop off-phase, start on-phase) once the timer expires and IEA>IREF. When IEA+I_HYS<ISNS, PWM operations are stopped (stop on-phase, start off-phase). In the switching converter of the system 700, PFM operations are not a function of an error amplifier clamp. Instead, IEA is used to detect Vout and to decide when to start the next on-phase. Once an on-phase starts, the duration of the on-phase for PFM operations is decided by I_HYS. In steady-state PWM operations, the "on" time is decided by the "off" time and the duty cycle, where IEA+I_HYS regulate the inductor current.

As shown in FIG. 8, the system 800 includes a switching converter (e.g., with L, M1, the diode 104, Cout, and a control circuit 840 for M1) coupled to the load 106. More specifically, the system 800 includes many of the components introduced for the system 100 of FIG. 1, including the supply voltage source 102, L, the diode 104, Rfb1, Rfb2, M1, sensor 115, load 106, the operational amplifier 108. Note: there is no RS latch in the switching converter of the system 800 of FIG. 8. Also, the timer 832 for the switch converter of the system 800 includes R1, C1, S1, the current source 124, and the comparator 126 introduced in FIG. 1. In the example of FIG. 8, additional components are used between the timer 832 and the AND gate 606. More specifically, the control circuit 840 includes D flip-flop 826 with a clear node coupled to the timer 832. The clock node of the D flip-flop 826 is coupled to the output of the AND gate 606 via an inverter 830. The output node of the D flip-flop 826 is coupled to the AND gate 606 via another inverter 828.

In the example of FIG. 8, the control circuit 840 includes the current source 708 coupled to the output of the operational amplifier 108, where the current source 708 provides IEA based on a supply voltage from node 712, R2, C2, and the output of the operational amplifier 108. In the example of FIG. 8, the operational amplifier 108, R2, C2, and the current source 708 correspond to a transconductance stage to provide an IEA output. The IEA value from the current source 708 or IEA+I_HYS is provided to a current comparator 806, which compares IEA or IEA+I_HYS (the input to the current comparator is labeled "I_ERR", where I_ERR is a function of IEA) with a reference current (IS) corresponding to IREF+I_DYN+ISNS, where IREF is provided by a first current source 818, I_DYN is provided by a second current source 822, and ISNS is provided by the sensor 115. As shown, the first current source 818 is coupled between a supply voltage node 820 and the negative input of the current comparator 806. The second current source 822 is coupled between a supply voltage node 824 and the negative input of the current comparator 806. The output of the current comparator 806 is provided to one of the input nodes of the AND gate 606. The output of the current comparator 806 is also used to control S3 (to selectively combined IEA with I_HYS). The other input node of the AND gate 606 is coupled to the output of the inverter 828. Thus, when I_ERR is higher than IREF+I_DYN+ISNS, and when the timer signal from the timer 832 is high, the AND gate 606 provides a high signal, which is passed to the gate driver 130.

As shown in FIG. 8, one of the inputs to the current comparator 806 is I_ERR (IEA or IEA+I_HYS), where the current source 708 provides IEA based on a supply voltage from node 712, R2, C2, and the output of the operational amplifier 108. As previously noted, I_HYS is selectively added to the IEA value, where I_HYS is generated by a current source 802 and is provided to the current comparator 806 via a switch S3, where S3 is operated based on the output of the current comparator 806. As shown, the current source 802 (e.g., a constant DC current source) is coupled between S3 and a supply voltage node 804. Relative to the switching converter for the system 100 of FIG. 1 and the switching converter topology 500 of FIG. 5, the switching converter of the system 800 of FIG. 8 improves the performance of power-save mode operations (e.g., reducing output DC offset between PFM and PWM operations, and reducing output AC ripple).

Comparing the switching converter of the system 800 of FIG. 8 with the switching converter topology 500 of FIG. 5, several features may be highlighted. Again, in the switching converter topology 500, PWM operations are initiated using a timer (e.g., an off timer). Once the timer expires, PWM operations are initiated (stop off-phase, start on-phase). When IEA<ISNS, PWM operations are stopped (stop on-phase, start off-phase). In the switching converter topology 500, PFM operations are a function of the error amplifier clamp (the PFM "on" time is determined by the low clamped value). Also, the "on" time for PWM operations is decided by the "off" time and the duty cycle, where IEA regulates the inductor current. In the switching converter topology 500, PFM operations are a function of the error amplifier clamp (the PFM "on" time is determined by the low clamped value). In steady-state PWM operations, the "on" time is decided by the "off" time and the duty cycle, where IEA regulates the inductor current.

The switching converter of the system 800 compares to the switching converter topology 500 as shown in Table 2.

TABLE 2

| | Switching Converter Topology 500 | Switching Converter of the system 800 |
|---|---|---|
| PWM Logic A) and B) repeated as loop | A) OFF time expired, stop OFF-phase, start ON-phase. B) IEA < ISNS, stop ON-phase, start OFF-phase. | A) OFF time expired, AND IEA > IREF, stop OFF-phase, start ON-phase. B) IEA + I_HYS < IREF + ISNS stop ON-phase, start OFF-phase |
| ON time (inductor peak current) in PFM | The output of EA has low clamp, ON time in PFM is decided by the low clamped value. | EA is not clamped, IEA is used to detect VOUT and decided when to start the next ON-Phase. ON time in PFM is decided by I_HYS. |
| ON time in PWM | In steady state ON time decided by the OFF time and the duty cycle; IEA regulates the inductor current. | In steady state ON time decided by the OFF time and the duty cycle; IEA + I_HYS regulate the inductor current |

The switching converter of the system 800 also initiates PWM operations using a timer (e.g., an off timer). However, PWM operations are initiated (stop off-phase, start on-phase) once the timer expires and IEA>IREF. When IEA+I_HYS<ISNS, PWM operations are stopped (stop on-phase, start off-phase). In the switching converter of the system 800, PFM operations are not a function of an error amplifier clamp. Instead, IEA is used to detect Vout and to decide when to start the next on-phase. Once an on-phase starts, the duration of the on-phase for PFM operations is decided by I_HYS. In steady-state PWM operations, the "on" time is decided by the "off" time and the duty cycle, where IEA+I_HYS regulate the inductor current.

In some examples, the output node 105 of a switching converter (e.g., the switching converter topology 600 in FIG. 6, the switching converter of the system 700 of FIG. 7, or the switching converter of the system 800 of FIG. 8) is coupled to Cout and a load, where the switching converter is configured to provide an output voltage to Cout based on an active mode and a power-save mode. In some examples, a controller (e.g., the controller 640 in FIG. 6, the controller 740 in FIG. 7, or the controller 840 in FIG. 8) for the switching converter is configured to perform pulse gating in the power-save mode based on the timer (e.g., the timer 608 in FIG. 6, the timer 730 in FIG. 7, or the timer 832 in FIG. 8) and a comparison of the output voltage (Vout) with a voltage threshold. In the examples of FIGS. 6-8, the output voltage is used to generate a current (e.g., IEA or I_ERR), which is compared with a threshold current (e.g., ISNS or I_DYN as in FIG. 6, ISNS or IREF+I_DYN as in FIG. 7, or ISNS+IREF+I_DYN as in FIG. 8).

In some examples, the controller is configured to set a threshold current (e.g., ISNS or I_DYN as in FIG. 6, ISNS or IREF+I_DYN as in FIG. 7, or ISNS+IREF+I_DYN as in FIG. 8) for a comparator (e.g., the comparators 602 in FIGS. 6 and 7, or the comparator 806 in FIG. 8), where the comparator is configured to compare the threshold current with an error amplifier output current (IEA or I_ERR, where I_ERR is a function of IEA), and wherein an output of the comparator indicates if the output voltage is lower than the voltage threshold. In some examples, the controller is configured to initiate an on-phase in response to the timer indicating an off time is expired and in response to an output of the comparator indicating that the output voltage is less than the voltage threshold. The controller is configured to add a hysteresis current (I_HYS) to the error amplifier output (IEA) current when the error amplifier output current (IEA) is greater than the threshold current (e.g., ISNS or I_DYN as in FIG. 6, ISNS or IREF+I_DYN as in FIG. 7, or ISNS+IREF+I_DYN as in FIG. 8). In some examples, the controller is configured to stop an on-phase in response to a sense current (ISNS) being greater than the hysteresis current (I_HYS). In some examples, the threshold current is adjusted using a reference current source and a current ramp source (e.g., IREF+I_DYN as in FIG. 7, or ISNS+IREF+I_DYN as in FIG. 8). In some examples, the comparator is a first comparator (e.g., comparator 602 in FIGS. 6 and 7), and wherein the controller comprises a second comparator (e.g., the comparator 604 in FIGS. 6 and 7) configured to compare the sense current (ISNS) with the error amplifier current (IEA or I_ERR). In some examples, the controller includes an AND gate (e.g., the AND date 606 in FIGS. 6-8) coupled to an output of a comparator (e.g., the comparator 604 in FIGS. 6 and 7, or the comparator 806 in FIG. 8) and to a timer (e.g., the timer 608 in FIG. 6, the timer 730 in FIG. 7, or the timer 832 in FIG. 8). The controller may also include a gate driver (e.g., the gate driver 130 in FIGS. 6-8) coupled to an output of the AND gate. The controller may also include a switch (e.g., M1 in FIGS. 6-8) configured to couple or decouple the hysteresis current (I_HYS) from the error amplifier output current.

Figure 9:
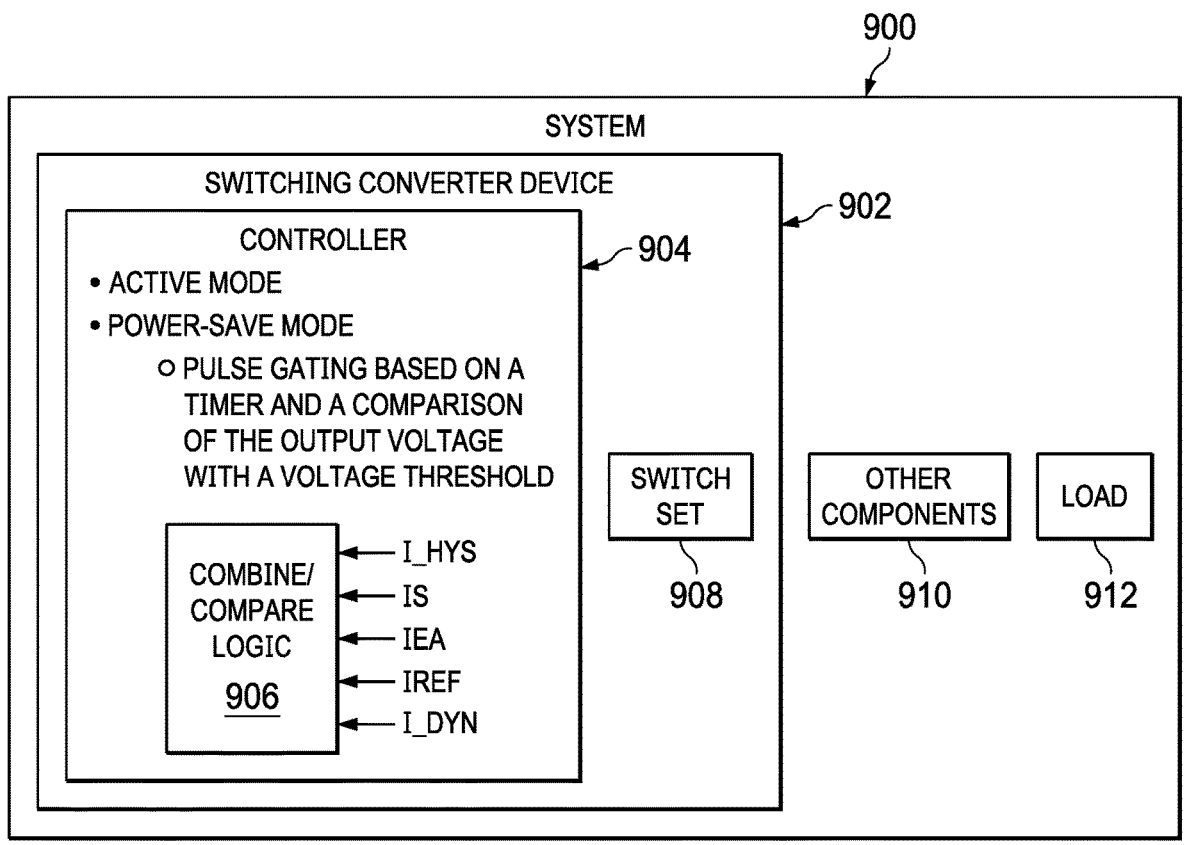
FIG. 9 is a block diagram of a system in accordance with some examples.

FIG. 9 is a block diagram showing a system 900 in accordance with some examples. In different examples, the system 900 corresponds to an integrated circuit, a system-on-a-chip (SoC), a multi-die module (MDM), or a printed circuit board (PCB) with combination of integrated circuit components and discrete components. As shown, the system 900 includes a switching converter device 902 configured to provide power to a load 912. More specifically, the switch converter device 902 includes a controller 904 and a switch set 908, where the controller 904 uses an active mode and a power-save mode. In the power-save mode, the controller 904 performs pulse gating based on a timer and a comparison of the output voltage with a voltage threshold.

In the example of FIG. 9, the controller 904 includes combine/compare logic 906 that receives I_HYS, IS, IEA, IREF, and I_DYN. Example components of the combine/compare logic 906 includes comparators (e.g., the current comparators 602 and 604 of FIGS. 6 and 7, or the current comparator 806 in FIG. 8) and logic gates (e.g., the AND gate in FIGS. 6-8) as described for FIG. 608. In the active mode, the controller 904 uses PWM and PFM to control the switch set 908 to provide Vout to the load 912. As shown, the system 900 also includes other components 910 (e.g., L and Cout), which are not included with the switching converter device 902. For example, the switching converter device 902 may be an integrated circuit and the other components 910 are discrete components external to the switching converter device 902. In some examples, the switching converter device 902 corresponds to a boost converter circuit that includes the components represented for the switching converter 600 of FIG. 6, where L is external to the switching converter device 902. In other examples, the switching converter device 902 corresponds to a boost converter circuit that includes the components represented for the switching converter of the system 700 of FIG. 7, where the supply voltage source 102, L, the diode 104, Cout, and the load 106 are external to the switching converter device 902. In other examples, the switching converter device 902 corresponds to a boost converter circuit that includes the components represented for the switching converter of the system 800 of FIG. 8, where the supply voltage source 102, L, the diode 104, Cout, and the load 106 are external to the switching converter device 902.

In some examples, the system 900 represents an optical communication system, where the load 912 corresponds to a light source. In such a system, an example input supply voltage (not shown) to the switching converter device 902 is 3.3V, and an example output supply voltage from the switching converter device 902 is 20V to 80V. In an optical communication system, VOUT from the switching converter device 902 is to drive a light source (e.g., an APD), where the light source is used for optical communications. The light source current is the loading of the switching converter device 902 (e.g., an APD current is typical 2 µA to 2 mA). In some examples, the switching converter device 902 is also configured to measure the light source current by obtaining samples of the light source current, converting the samples to respective voltage signals, and buffering the voltage signals. As desired, an external system may use an ADC to read the output voltage. Some light sources such as APDs need a high voltage, and it is important that this voltage is low ripple and low noise (so the sampled APD current is accurate enough).

In one example of the switching converter device 902, the light source current (2 µA to 2 mA) is mirrored, and one or more ratio options are used to provide a current proportional to light source current. By connecting a resistor from the mirror output to a ground node, the current flowing through the light source is converted into the voltage across the resistor. The optical communication system may also include sample/hold circuitry built-in and triggered by an external sampling clock. In some examples, the current mirror signal (the voltage across the resistor) is transferred and stored on a hold-up capacitor. The voltage on the hold-up capacitor is then passed over to the output of an operational amplifier. An external ADC can sense the voltage of the output of the operational amplifier to measure the current signal of the light source.

FIGS. 10-15 are timing diagrams showing waveforms related to the switching converters in accordance with some examples. In the timing diagram 1000 of FIG. 10, various waveforms are represented, including an IL waveform 1002, a Vout waveform 1012, a Vout target waveform 1022, an IREF waveform 1032, and an IEA waveform 1042. In the timing diagram 1000, whenever Vout drops below the Vout target, switching operations cause current to flow to L resulting in a pulse 1004 in the IL waveform 1002. The pulse 1004 causes the value of Vout to rise to a peak 1014. Also, the IEA waveform 1042 shows that a peak 1044 for IEA occurs when Vout is at a minimum value 1016. The timing diagram 1000 corresponds to an ideal scenario, where a boost converter builds up inductor current in an on-phase, and in off-phase the Vout increases. When Vout increases above a target, IEA will decrease and skip the next cycle. When Vout is discharge by the load, IEA ramps up and a new cycle is started.

In the timing diagram 1100 of FIG. 11, various waveforms are represented, including an IL waveform 1102, a Vout waveform 1112, a Vout target waveform 1122, an IREF waveform 1132, and an IEA waveform 1142. In the timing diagram 1100, whenever Vout drops below the Vout target, switching operations cause current to flow to L resulting in pulses 1104 and 1106 in the IL waveform 1102. The pulses 1104 and 1106 cause the value of Vout to rise to peaks 1114 and 1116, where peak 1116 is offset from that target Vout by more than desired. Again, the IEA waveform 1142 shows that a peak 1144 for IEA occurs when Vout is at a minimum value 1118. The timing diagram 1100 corresponds to a scenario where the loop response is limited such that IEA may not decrease fast enough at off-phase. In such case, if IEA>IREF when the off-phase ends, I_ERR will start one more cycle after the off-phase, even though Vout is already higher than the target. This issue is referred to as "double pulses" in PFM, which causes the output ripple to be larger than desired. To avoid double pulses, I_DYN may be added to IREF such that the new reference current used by the current comparator 604 (see FIGS. 6 and 7), or the current comparator 806 (see FIG. 8) is I_DYN+IREF.

Figure 12:
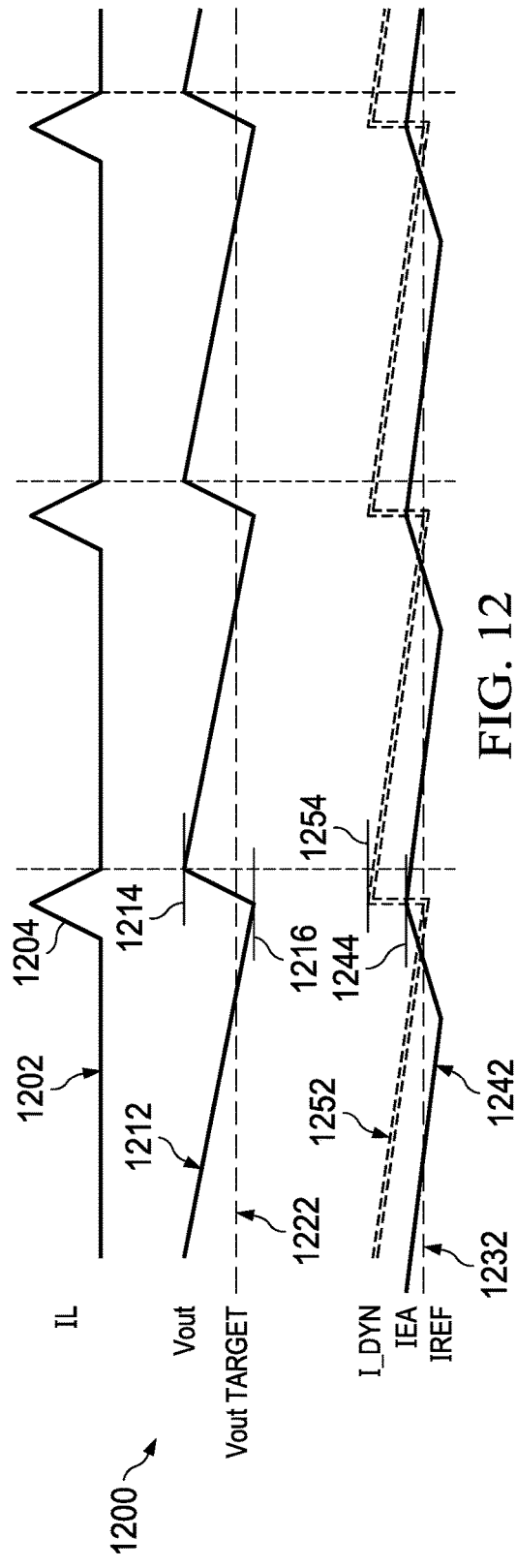

In the timing diagram 1200 of FIG. 12, various waveforms are represented, including an IL waveform 1202, a Vout waveform 1212, a Vout target waveform 1222, an IREF waveform 1232, an IEA waveform 1242, and an I_DYN waveform 1252. In the timing diagram 1200, whenever Vout drops below the Vout target, switching operations cause current to flow to L resulting in a pulse 1204 in the IL waveform 1202. The pulse 1204 causes the value of Vout to rise to a peak 1214. Also, the IEA waveform 1242 shows that a peak 1244 for IEA occurs when Vout is at a minimum value 1216. The timing diagram 1200 corresponds to a scenario where I_DYN is added to IREF after on-phase end. In a light load scenario, one switch pulse is enough to charge Vout higher than the target voltage. Also, in the timing diagram 1200, IEA starts to ramp down when the off-phase start. With I_DYN, IEA ramps down slowly, and the total reference current is higher than IEA, which avoids double pulses.

Figure 13:
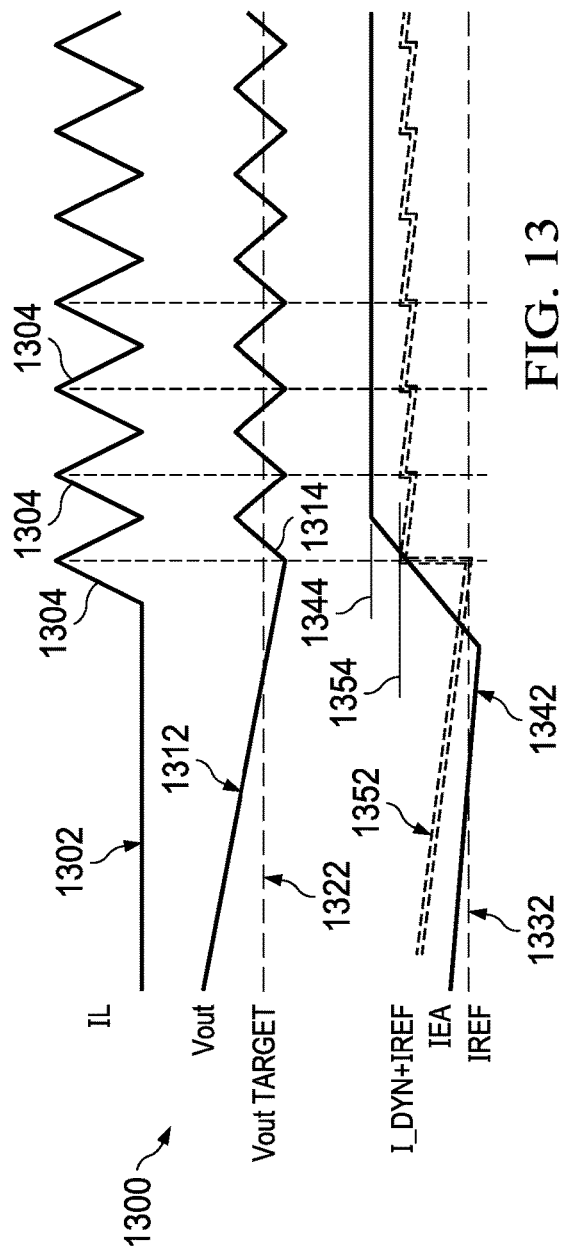

In the timing diagram 1300 of FIG. 13, various waveforms are represented, including an IL waveform 1302, a Vout waveform 1312, a Vout target waveform 1322, an IREF waveform 1332, an IEA waveform 1342, and an I_DYN+ IREF waveform 1352. In the timing diagram 1300, whenever Vout drops below the Vout target, switching operations cause current to flow to L resulting in pulses 1304 in the IL waveform 1302. The pulses 1304 cause the value of Vout to track the target Vout value even in a heavy load condition. Also, the IEA waveform 1342 shows that IEA stays at a peak value 1344 once switching operations related to the pulses 1304 begin. Also, the I_DYN+IREF waveform 1352 shows that I_DYN+IREF stays near a peak value 1354 once switching operations related to the pulses 1304 begin. The timing diagram 1300 corresponds to a heavy load scenario, where use of I_DYN causes no significant impact to active mode operations (used when the load is sufficiently high).

In the timing diagram 1400 of FIG. 14, various waveforms are represented, including an IL waveform 1402, a Vout waveform 1412, a Vout target waveform 1422, an IREF waveform 1432, and an IEA waveform 1442. In the timing diagram 1400, whenever Vout drops below the Vout target, switching operations cause current to flow to L resulting in a pulse 1404 in the IL waveform 1402. The pulse 1404 causes the value of Vout to rise to a peak 1414. Also, the IEA waveform 1442 shows that a peak 1444 for IEA occurs when Vout is at a minimum value 1416. The timing diagram 1400 corresponds to a scenario where double pulses are avoided. In a power-save mode (e.g., a PFM mode), with load increase, the switching frequency will increase and IEA will have a smaller ripple. With the flat IREF value represented in the timing diagram 1400, the trigger point is sensitive to noise. Since the trigger point decides the turn on of next boost switch cycle, a trigger point that is sensitive to noise results in PFM frequency jitter in IEA relative to IREF (IEA goes above and below IREF).

In the timing diagram 1500 of FIG. 15, various waveforms are represented, including an IL waveform 1502, a Vout waveform 1512, a Vout target waveform 1522, an IREF waveform 1532, an IEA waveform 1542, and an I_DYN+ IREF waveform 1552. As shown in the timing diagram 1500, I_DYN+IREF ramps down while IEA ramps up, resulting in less sensitivity to noise (IEA stays above IREF).

Figure 16:
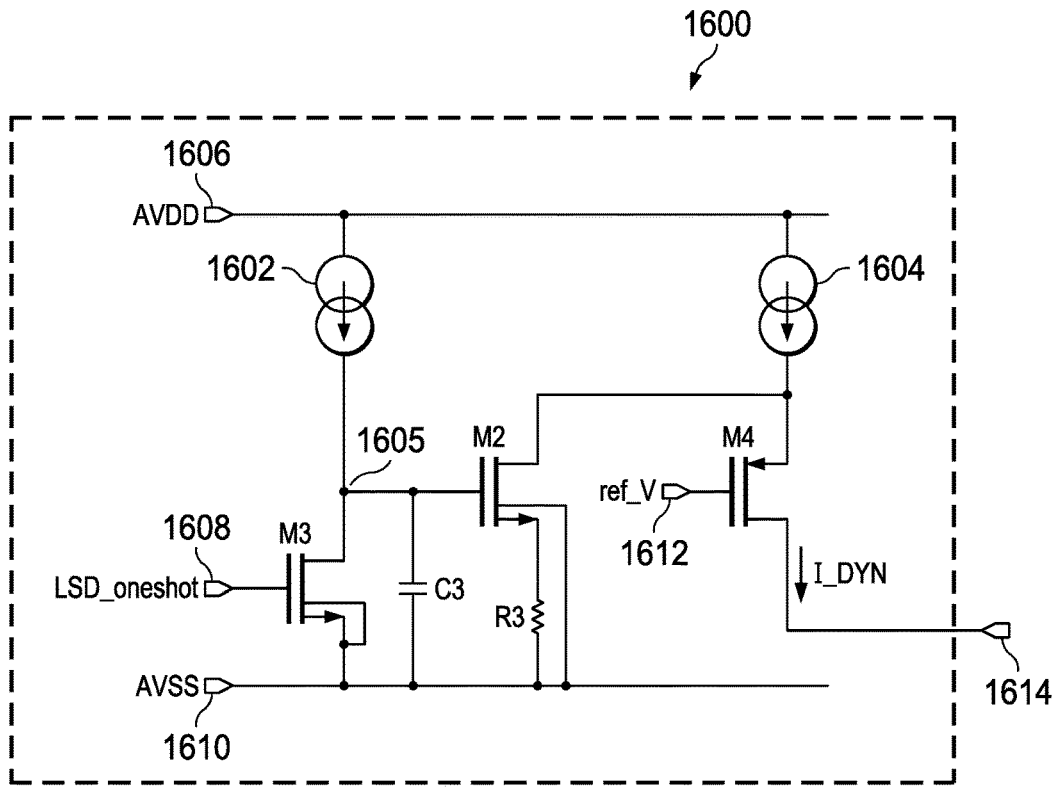
FIG. 16 is a schematic diagram showing a ramp current source for a switching converter in accordance with some examples.

FIG. 16 is a schematic diagram showing a ramp current source 1600 (an example of the second current source 722 of FIG. 7 to provide I_DYN, or the second current source 822 of FIG. 8 to provide I_DYN) for a switching converter in accordance with some examples. As shown, the ramp current source 1600 comprises a first current source 1602 and a second current source 1604 coupled to a positive supply (AVDD) node 1606. The first current source 1602 is coupled between the AVDD node 1606 and the control terminal of a first transistor (M2). The first current source 1602 is also coupled between the AVDD node 1606 and a first current terminal of a second transistor (M3). Meanwhile, the second current source 1604 is coupled between the AVDD node 1606 and the first current terminal of M2 as well as the first current terminal of a third transistor (M4). The control terminal of M3 is coupled to a control signal (LSD_oneshot) node 1608, and the second current terminal of M3 is coupled to a negative supply or ground (AVSS) node 1610.

In the example of FIG. 16, a capacitor (C3) is placed between the control terminal of M2 and the AVSS node 1610. Also, the second current terminal of M2 is coupled to the AVSS node 1610 via a resistor R3. The body of M2 is also coupled to the AVSS node 1610. Also, the control terminal of M4 is coupled to a control signal (ref V) node 1612. Finally, the second current terminal of M4 is coupled to an output node 1614 to provide I_DYN.

In operation, when an off-phase starts, M3 is briefly turned on, resulting in the voltage at the node 1605 being quickly discharged to the AVSS node 1610. Subsequently, the voltage at the node 1605 starts to ramp up with current source 1602 charging C3. So current through M2 ramps up in an off-phase. Also, I_DYN=the current from the first current source 1602 minus the current passing through M2.

Figure 17:
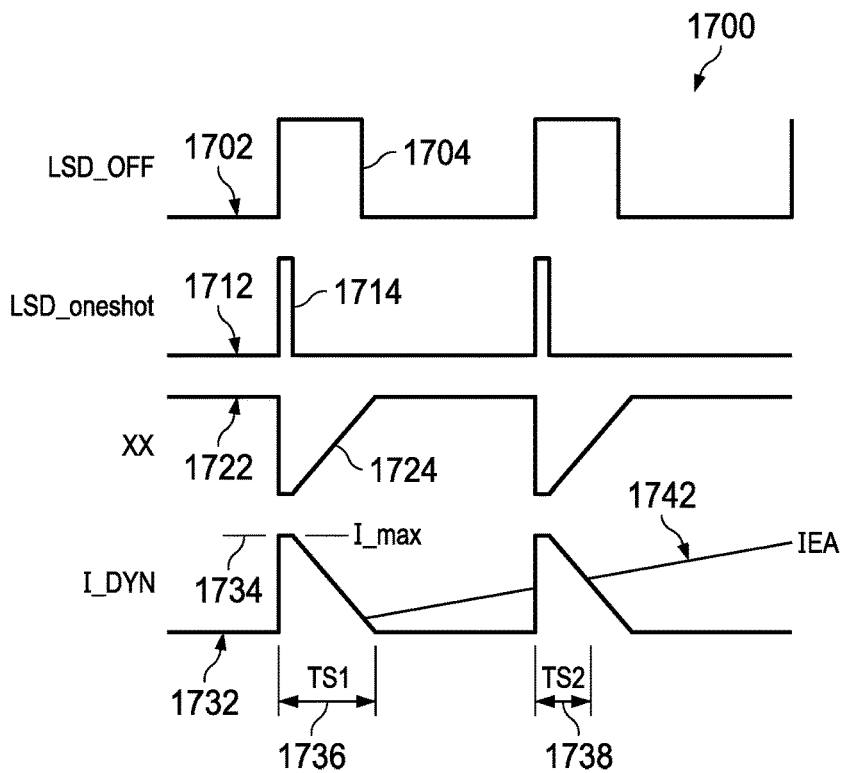
FIG. 17 is a timing diagram showing waveforms related to the ramp current source of FIG. 16 in accordance with some examples.

FIG. 17 is a timing diagram 1700 showing waveforms related to the ramp current source of FIG. 16 in accordance with some examples. In the timing diagram 1700 of FIG. 17, various waveforms are represented, including an LSD_OFF waveform 1702, an LSD_oneshot waveform 1712, an XX waveform 1722, an I_DYN waveform 1732, and an IEA waveform.

In the timing diagram 1700, the ramp current corresponding to the I_DYN waveform 1732 is added when an on-phase stops and an off-phase starts as indicated by pulses 1704 and 1714 of the LSD_OFF and LSD_oneshot waveforms 1702 and 1712. Also, the voltage at node 1605 decreases before recovering as indicated by the negative pulse 1724 of the XX waveform 1722. An example peak current (I_MAX) value 1734 for I_DYN is 10 µA. After the peak current value 1734, I_DYN ramps down to 0 in approximately 2 µs as indicated by the I_DYN waveform 1732. Assuming IEA does not change much (e.g., IEA is close to IREF at light load), then I_DYN+IREF>IEA when an off-phase starts. Accordingly, the blanking on-phase starts until I_DYN ramps down and/or IEA ramps up. When the load is very light, IEA is close to IREF and the blanking time (TS1) 1736 is close to the ramp time (e.g., 2 µs), which is usually enough time for the loop to realize that Vout is higher than the Vout target with only 1 switch cycle. If IEA increases at heavy load as indicated by the IEA waveform 1742, the blanking time (TS2) 1738 is shorter than the off time (e.g., the duration of pulse 1704), and will have no impact on the switching frequency at heavy loads. As needed, I_ERR starts a new on-phase when I_DYN does not ramp down to OA (just as the equivalent IREF is increased).

With the disclosed switching converter topologies, various benefits are achieved compared to other switching converter topologies. For example, the same output voltage level for PFM and PWM is used. Also, a ramp current (I_dyn) is added for the reference current, where the ramp current generates a dynamic blanking time. This dynamic blanking time helps the error amplification (EA) gain enough response time at PFM to make single pulse PFM possible with no impact to continuous conduction mode (CCM) when EA output current is high. Also, a hysteresis current (I_HYS) is used to set the inductor peak current during PFM. Usually I_HYS>>IEA at light loads, so the inductor peak current at light loads is constant. With I_HYS, IEA has a much lower dynamic transient range in PFM, and thus the transient speed is much fast than some other switching converter topologies. Also, there is no dedicated/ extra PFM loop (e.g., one PWM comparator is used for multiple functions such as off-time stop and on-time start functions) to achieve both low cost and high performance.

With the disclosed switching converter topologies, the output voltage accuracy (an importance feature for customers) is improved compared to other switching converter topologies. Also, there is a seamless transition between PFM and PWM. Also, output accuracy is better, and loop compensation is simple. Also, the disclosed switching converter topologies are independent with off-time generator implementation. There have multiple off-time solutions to achieve different functions, like quasi-constant frequency, quasi-constant inductor current ripple, or just constant off-time. All of these off-time solutions are compatible with the disclosed switching converter topologies, which facilitates re-use of the disclosed switching converter topologies. Also, the ON-time in PFM is set by I_HYS, and I_HYS can be made adaptive to VOUT/VIN to have constant output ripple for different Vout and Vin scenarios. As another option, a constant I_HYS sets a constant inductor current ripple at PFM, making the disclosed switching converter topologies easy to re-use. Also, the disclosed switching converter topologies are simple, resulting in a very small increase in the circuit size. In some examples, the disclosed switching converter topologies can be used for a fixed frequency peak current mode boost converter or adaptive on time valley current control boost converter.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. An optical communication system, comprising:
a light source;
a capacitor coupled to the light source; and
a switching converter circuit coupled to the capacitor, the switching converter circuit configured to provide an output voltage to the capacitor, in which:
the output voltage is based on whether the switching converter circuit operates in an active mode or a power-save mode;
the switching converter circuit includes a controller, which includes a timer and a comparator;
the comparator has a comparator output, and the comparator is configured to: perform a comparison between a threshold current and an error amplifier output current, in which the threshold current indicates a threshold voltage, and the error amplifier output current indicates the output voltage; and responsive to the comparison, indicate at the comparator output whether the output voltage is below the threshold voltage; and
the controller is configured to: set the threshold current; perform pulse gating of the output voltage in the power-save mode based on the timer and the comparator output; and initiate an on-phase responsive to the timer indicating expiration of an off time and responsive to the comparator output indicating the output voltage is below the threshold voltage.

2. An optical communication system, comprising:
a light source, a capacitor coupled to the light source; and
a switching converter circuit coupled to the capacitor, the switching converter circuit configured to provide an output voltage to the capacitor, in which:
the output voltage is based on whether the switching converter circuit operates in an active mode or a power-save mode;
the switching converter circuit includes a controller, which includes a timer and a comparator;
the comparator has a comparator output, and the comparator is configured to: perform a comparison between a threshold current and an error amplifier output current, in which the threshold current indicates a threshold voltage, and the error amplifier output current indicates the output voltage; and responsive to the comparison, indicate at the comparator output whether the output voltage is below the threshold voltage; and
the controller is configured to: set the threshold current; perform pulse gating of the output voltage in the power-save mode based on the timer and the comparator output; and add a hysteresis current to the error amplifier output current responsive to the error amplifier output current being greater than the threshold current.

3. The system of claim 2, wherein the controller is configured to stop an on-phase responsive to the error amplifier output current plus the hysteresis current being less than a sense current plus a reference current.

4. The system of claim 3, wherein the comparator is a first comparator, and the controller comprises a second comparator configured to compare the sense current with the error amplifier output current.

5. The system of claim 2, further comprising:
an AND gate having an output and first and second inputs, in which the first input of the AND gate is coupled to the comparator output, and the second input of the AND gate is coupled to the timer;
a gate driver having a driver input and a driver output, the driver input coupled to the output of the AND gate; and
a switch configured to couple or decouple the hysteresis current from the error amplifier output current.

6. An optical communication system, comprising:
a light source;
a capacitor coupled to the light source; and
a switching converter circuit coupled to the capacitor, the switching converter circuit configured to provide an output voltage to the capacitor, in which:
the output voltage is based on whether the switching converter circuit operates in an active mode or a power-save mode;
the switching converter circuit includes a controller, which includes a timer and a comparator;
the comparator has a comparator output, and the comparator is configured to: perform a comparison between a threshold current and an error amplifier output current, in which the threshold current indicates a threshold voltage, and the error amplifier output current indicates the output voltage; and responsive to the comparison, indicate at the comparator output whether the output voltage is below the threshold voltage; and
the controller is configured to: set the threshold current; perform pulse gating of the output voltage in the power-save mode based on the timer and the comparator output; and adjust the threshold current using a reference current source and a current ramp source.

7. A switching converter circuit, comprising:
a switch having a gate, the switch coupled between an output terminal and a ground terminal;
a gate driver having a driver input and a driver output, the driver output coupled to the gate;
an error amplifier current source;
a threshold current source;
a comparator having a comparator output and first and second comparator inputs, the first comparator input coupled to the error amplifier current source, and the second comparator input coupled to the threshold current source;
a timer; and
an AND gate having an output and first and second inputs, in which the first input of the AND gate is coupled to the comparator output, the second input of the AND gate is coupled to the timer, and the output of the AND gate is coupled to the driver input.

8. The switching converter circuit of claim 7, wherein the threshold current source comprises a reference current source and a current ramp source.

9. The switching converter circuit of claim 7, wherein the threshold current source comprises an inductive current sensor at the output terminal.

10. The switching converter circuit of claim 7, wherein the comparator is a first comparator, and the switching converter circuit further comprises a second comparator configured to compare a sense current with a hysteresis current.

11. The switching converter circuit of claim 10, further comprising a control switch and a hysteresis current source, in which the control switch is coupled between the hysteresis current source and the second comparator, the hysteresis current source is configured to provide the hysteresis current via the control switch to the second comparator, and the control switch is coupled to the output of the AND gate.

12. A switching converter device, comprising:
a switch coupled between an output terminal and a ground terminal, the switch having a gate; and
a controller including a gate driver, a timer, a comparator, an AND gate, a threshold current source and an error amplifier current source, in which:
the gate driver has a driver input and a driver output; the driver output is coupled to the gate;
the error amplifier current source has an amplifier input and an amplifier output, the amplifier input is coupled to the output terminal, and the error amplifier current source is configured to provide a current at the amplifier output based on the amplifier input;
the comparator has a comparator output and first and second comparator inputs, the first comparator input is coupled to the amplifier output, and the second comparator input is coupled to the threshold current source;
the AND gate has a first input, a second input and an output, the first input of the AND gate is coupled to the comparator output, the second input of the AND date is coupled to the timer, and the output of the AND gate is coupled to the driver input; and
the controller is configured to perform pulse gating of the switch in a power-save mode based on the timer and the comparator output.

13. The switching converter device of claim 12, wherein the comparator is a first comparator, and the controller comprises a second comparator, an RS latch and a control switch, in which:
the RS latch has a latch output and first and second latch inputs;
the latch output is coupled to the driver input and to the control switch;
the second comparator is configured to compare a sense current of the output terminal with hysteresis current, an output of the second comparator is coupled to the first latch input and the output of the AND gate is coupled to the second latch input.

14. The switching converter device of claim 13, wherein the controller comprises a hysteresis current source configured to provide the hysteresis current via the control switch to the second comparator.

15. A switching converter device, comprising:
a switch coupled between an output terminal and a ground terminal; and
a controller including a timer, a comparator, a threshold current source and an error amplifier current source, in which:
the error amplifier current source has an amplifier input and an amplifier output, the amplifier input is coupled to the output terminal, and the error amplifier current source is configured to provide a current at the amplifier output based on the amplifier input;
the comparator has a comparator output and first and second comparator inputs, the first comparator input is coupled to the amplifier output, the second comparator input is coupled to the threshold current source, and the threshold current source comprises a reference current source and a current ramp source; and
the controller is configured to perform pulse gating of the switch in a power-save mode based on the timer and the comparator output.

16. A switching converter device, comprising:
a switch coupled between an output terminal and a ground terminal; and
a controller including a timer, a comparator, a threshold current source and an error amplifier current source, in which:
the error amplifier current source has an amplifier input and an amplifier output, the amplifier input is coupled to the output terminal, and the error amplifier current source is configured to provide a current at the amplifier output based on the amplifier input;
the comparator has a comparator output and first and second comparator inputs, the first comparator input is coupled to the amplifier output, the second comparator input is coupled to the threshold current source, and the threshold current source comprises a sense current circuit inductively coupled to the output terminal; and
the controller is configured to perform pulse gating of the switch in a power-save mode based on the timer and the comparator output.

17. A switching converter controller circuit, comprising:
a switch;
a timer circuit;
a driver circuit;
a current comparator having a comparator output and first and second comparator inputs;
a first current source coupled to the first comparator input and configured to provide an error amplifier current to the first comparator input;
a second current source coupled to the first comparator input and configured to provide a hysteresis current to the first comparator input via the switch;
a sensor coupled to the second comparator input and configured to provide a sensed output current to the second comparator input; and
an AND gate having an output and first and second inputs, in which the first input of the AND gate is coupled to the timer circuit, and the output of the AND gate is configured to control when the comparator output is provided to the driver circuit.

18. The switching converter controller circuit of claim 17, wherein the current comparator is a first current comparator, and the switching converter controller circuit further comprises:
third and fourth current sources;
a second current comparator having an output and first and second inputs, in which the first input is coupled to the first current source, the second input is coupled to the third and fourth current sources, the third current source is configured to a provide a reference current, and the fourth current source is configured to provide a ramp current; and
a latch circuit having an input and a control terminal, in which the input of the latch circuit is coupled to the first comparator output, the control terminal is coupled to the output of the AND gate, and the output of the second current comparator is coupled to the second input of the AND gate.

19. The switching converter controller circuit of claim 17, wherein the current comparator is a first current comparator, and the switching converter controller circuit further comprises:
 third and fourth current sources; and
 a second current comparator having an output and first and second inputs, in which the first input is coupled to the first current source, the second input is coupled to the third and fourth current sources, the third current source is configured to a provide a reference current, the fourth current source is configured to provide a ramp current, and the output of the second current comparator is coupled to the second input of the AND gate.

* * * * *